United States Patent Office 3,546,185
Patented Dec. 8, 1970

3,546,185
INHIBITING PREMATURE VULCANIZATION OF DIENE RUBBERS
Aubert Yaucher Coran, Creve Coeur, Mo., and Joseph Edward Kerwood, Saint Albans, W. Va., assignors to Monsanto Company, St. Louis, Mo., a corporation of Delaware
No Drawing. Continuation-in-part of applications Ser. No. 459,466, May 27, 1965; Ser. No. 549,730, May 12, 1966; and Ser. No. 579,493, Sept. 15, 1966. This application Mar. 20, 1968, Ser. No. 714,445
Int. Cl. C08f *27/06;* C07d *49/34;* C07g *153/00*
U.S. Cl. 260—79.5                59 Claims

ABSTRACT OF THE DISCLOSURE

Sulfenamides characterized by carbonyl adjacent to the sulfenamide nitrogen, the characteristic nucleus of which is

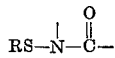

where the dangling valence on the nitrogen may be linked to a second carbonyl, alkyl, aryl, cycloalkyl, hydrogen, alkylene carbon, or arylene carbon, and R is alkyl, aryl, or cycloalkyl. The compounds, many of which are new, inhibit premature vulcanization of vulcanizable elastomers and stabilize styrene-butadiene rubber.

CROSS REFERENCES TO RELATED APPLICATIONS

This application is a continuation-in-part of the application Ser. No. 579,493, filed Sept. 15, 1966 now abandoned, a continuation-in-part of the application Ser. No. 549,730, filed May 12, 1966 now abandoned, and a continuation-in-part of the application Ser. No. 459,466, filed May 27, 1965 now abandoned.

BACKGROUND OF THE INVENTION

This invention relates to an improved vulcanizing process for rubber and to the rubber stocks obtained by using this improved process. The invention relates to improved accelerator-inhibitor combinations for rubber. The invention also relates to new compounds useful as inhibitors of premature vulcanization in rubber. More particularly, the invention relates to a method for preventing the premature vulcanization of rubber stocks and to the rubber stocks obtained by using this method.

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz., premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

There are several reasons offered for premature vulcanization. The discovery of the thiazolesulfenamide accelerators constituted a major breakthrough in the vulcanization art because thiazolesulfenamides delayed onset of the vulcanizing process, but once it started the built-in amine activation of the thiazole resulted in strong, rapid curing. Mercaptobenzothiazole is a valuable organic vulcanization accelerator but by present standards would be considered scorchy. It has been largely replaced by the delayed-action accelerators, but further improvement has eluded the art. The development of high pH furnace blacks which lack the inherent inhibiting effect of the acidic channel blacks and the popularity of certain phenylenediamine antidegradants which promote scorching have placed increasingly stringent demands on the accelerator system.

Retarders have long been available to rubber compounders. These include N-nitrosodiphenylamine, salicyclic acid, and a terpene-resin acid blend. See Editors of Rubber World, "Compounding Ingredients for Rubber," 91–94 (3rd ed., 1961). Acids as retarders are generally ineffective with thiazolesulfenamide accelerators or adversely affect this vulcanizing process. Nitrosoamines as retarders are only of limited effectiveness with thiazolesulfenamides derived from primary amines. Certain sulfenamides which are not accelerators per se have been shown to retard mercaptobenzothiazole and other scorchy accelerators, but the effect on another sulfenamide incorporated as the primary accelerator has been marginal. Similarly, mixtures of accelerating sulfenamides have been proposed as a means of improving processing safety, but neither of these innovations has significantly improved a good delayed-action accelerator.

Some of the inhibitors of the invention have vulcanizing and accelerating properties in their own right. For example, Belgian Patent 619,219 (1962) to U.S. Rubber discloses N-[(trichloromethyl)thio]maleimide as a vulcanizing agent. The sulfur-vulcanizing agents, accelerators, and antidegradants used in the combinations of this invention do not include the inhibitors of the invention. A combination of an accelerator and an inhibitor of this invention is an improved rubber additive which allows longer and safer processing time for rubber.

SUMMARY OF THE INVENTION

We have discovered a class of sulfenamides which are extremely valuable inhibitors of premature vulcanization. These are characterized by the presence of a carbonyl group adjacent to the sulfenamide nitrogen. The characteristic nucleus is

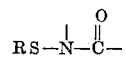

where the dangling valence on the nitrogen may be linked to a second carbonyl, alkyl, aryl, cycloalkyl, hydrogen, alkylene carbon, or arylene carbon and R is alkyl, aryl, or cycloalkyl. Aryl is used in the usual generic sense to mean any univalent organic radical where free valence belongs to an aromatic carbocyclic nucleus and not to a side chain. The term includes radicals substituted in the carbocyclic nucleus, for example, by alkyl, alkoxy, nitro, chloro, bromo, fluoro, iodo, and hydroxy. It is preferred that the carbocyclic nucleus contain not more than one electronegative substituent. Alkyl is used in the usual generic sense to mean univalent aliphatic radicals of the series $C_nH_{2n+1}$ and includes radicals substituted in the carbon chain, as for example, by aryl, alkoxy, nitro, chloro, bromo, fluoro, iodo, and hydroxy. Primary, secondary, and tertiary alkyls are included, for example, straight or branched chains. However, primary and secondary alkyl hydrocarbons of 1 to 20 carbon atoms are the preferred alkyl compounds of this invention. The term cycloalkyl includes cycloalkyl radicals of 5 to 12 carbon atoms in the ring. Carbon atoms of the heterocyclic nuclei which contain hydrogen can be substituted by alkyl, alkoxy, nitro, chloro, bromo, fluoro, iodo, and hydroxy, for example, 1,3 - bis(phenylthio) - 5-chloro-2-benzimidazolinone.

An object of this invention is to promote the progress of science and useful arts. An object of this invention is to provide a method of effectively prevent the premature vulcanization of rubber. A further object of this invention is to provide new chemical compounds useful as premature vulcanization inhibitors especially with delayed-action thiazolesulfenamides. A further object of this invention is to provide a method for a faster rate of cure for vulcanizable rubber without premature vulcanization. A further object of this invention is to provide a method to increase the available processing time prior to the actual vulcanization of rubber. A further object of this invention is to provide a method to prevent the premature vulcanization of crude rubber in storage containing a vulcanizing and accelerating agent. A further object of this invention is to provide a method to prevent the premature vulcanization of rubber during the actual vulcanization step. A further object of this invention is to prevent the premature vulcanization of rubber at any time. A further object of this invention is to provide a safer method for processing and vulcanizing rubber. A further object of this invention is to provide a stabilizer for rubber. A further object of this invention is to provide new and improved vulcanized rubber products. A further object of this invention is to provide a vulcanized rubber stock in which the rate of reversion is reduced. Other objects of the invention will become apparent as the description of our invention proceeds. These objects are accomplished by using a sulfenamide derived from an amide or imide in the processing of rubber.

DESCRIPTION OF THE PREFERRED EMBODIMENTS

Our invention is that compounds having the formula

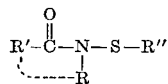

are excellent premature vulcanization inhibitors for a vulcanizable diene rubber where R and R' with the carbonyl and nitrogen atom constitute a radical, for example, N-phthalimidyl,
N-succinimidyl,
N-adipimidyl,
N-glutarimidyl,
N-3,3-dimethylglutarimidyl,
N-hexahydrophthalimidyl,
7-oxabicyclo[2.2.1]heptane-2,3-dicarboximid-N-yl,
7-oxabicyclo[2.2.1]hept-5-ene-2,3-dicarboximid-N-yl,
tetrapropenylsuccinimid-N-yl,
methylsuccinimid-N-yl,
octadecylsuccinimid-N-yl,
n-decenylsuccinimid-N-yl,
1,4,5,6,7,7-hexachlorobicyclo[2.2.1]hep-5-ene-2,3-dicarboximid-N-yl,
5,5-dimethyl-3-hydantoinyl,
hydantoinyl,
5,5-diphenyl-3-hydantoinyl,
N-maleimidyl,
4-cyclohexene-1,2-dicarboximid-N-yl,
2-benzimidazolinon-1-yl,
2-benzothiazolinon-N-yl,
3-arylthio-2-benzimidazolinon-1-yl,
3-alkylthio-2-benzimidazolinon-1-yl,
3-cycloalkylthio-2-benzimidazolinon-1-yl,
2-imidazolinon-1-yl,
3-cycloalkylthio-2-imidazolinon-1-yl,
3-arylthio-2-imidazolinon-1-yl,
3-alkylthio-2-imidazolinon-1-yl,
2-imidazolidinon-1-yl,
3-cycloalkylthio-2-imidazolidinon-1-yl,
3-arylthio-2-imidazolidinon-1-yl,
3-alkylthio-2-imidazolidinon-1-yl,
bicyclo[2.2.1]hept-5-ene-2,3-dicarboximid-N-yl,
alkylbicyclo[2.2.1]hept-5-ene-2,3-dicarboximid-N-yl,
N-(arylthio)-1,2,4,5-benzenetetracarboxylic-1,2:4,5-diimid-N'-yl,
N-(cycloalkylthio)-1,2,4,5-benzenetetracarboxylic-1,2:4,5-diimid-N'-yl,
N-(alkylthio)-1,2,4,5-benzenetetracarboxylic-1,2:4,5-diimid-N'-yl,
N-naphthalimidyl, or N-(3,4,5,6-tetrahalophthalimidyl), and R'' is alkyl, aryl, or cycloalkyl. More specific examples of R'' are CCl₃, methyl, ethyl, propyl, isopropyl, butyl, amyl, t-butyl, phenyl, benzyl, chlorophenyl, nitrophenyl, tolyl, naphthyl, cyclooctyl, cyclopentyl, and cyclododecyl.

The premature vulcanization inhibitors of this invention include compounds of the formula

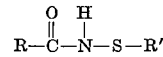

where

constitutes a radical, for example, N-(arylthio)carbamoyl, N - (cycloalkylthio)carbamoyl, N - (alkylthio)carbamoyl, N-arylcarbamoyl, N-alkylcarbamoyl, and N-cycloalkylcarbamoyl, and R' is alkyl, aryl, or cycloalkyl. More specific examples of

are

N-(phenylthio)carbamoyl,
N-(chlorophenylthio)carbamoyl,
N-(benzylthio)carbamoyl,
N-(tolylthio)carbamoyl,
N-(methylthio)carbamoyl,
N-(ethylthio)carbamoyl,
N-(propylthio)carbamoyl,
N-(isopropylthio)carbamoyl,
N-(t-butylthio)carbamoyl,
N-phenylcarbamoyl,
N-methylcarbamoyl,
N-ethylcarbamoyl,
N-propylcarbamoyl,
N-isopropylcarbamoyl,
N-t-butylcarbamoyl,
N-trichloromethylcarbamoyl,
N-benzylcarbamoyl,
N-nitrophenylcarbamoyl,
N-chlorophenylcarbamoyl, and
N-tolylcarbamoyl, and more specific examples of R' are methyl, ethyl, propyl, isopropyl, t-butyl, trichloromethyl, phenyl, benzyl, chlorophenyl, tolyl, nitrophenyl, naphthyl, sec. butyl, n-butyl, n-amyl, n-hexyl, n-heptyl, 2-ethylhexyl, n-octyl, n-decyl, n-undecyl, n-dodecyl, n-tridecyl, o-tolyl, p-tolyl, m-tolyl, p-ethylphenyl, p-isopropylphenyl, cyclooctyl, cyclopentyl, and cyclododecyl.

Examples of the new compounds of the invention are

N-(cyclohexylthio)phathalimide,
N-(cylopentylthio)phthalimide,
N-(cyclododecylthio)phthalimide,
N-(cyclooctylthio)phthalimide,
N-(benzylthio)phthalimide, N-(methylthio)phthalimide,
N-(ethylthio)phthalimide,
N-(propylthio)phthalimide,
N-(isopropylthio)phthalimide,
N-(n-butylithio)phthalimide,
N-(t-butylthio)phthalimide,
N-(isobutylthio)phthalimide,
N-(sec.-butylthio)phthalimide,
N-(n-pentylthio)phthalimide,
N-(n-heptylthio)phthalimide,
N-(n-hexylthio)phthalimide,
N-(n-octylthio)phthalimide,
N-(n-dodecylthio)phthalimide,
N-(cyclohexylthio)adipimide,
N-(cyclopentylthio)adipimide,
N-(cyclododecylthio)adipimide,
N-(cyclooctylthio)adipimide,
N-(benzylthio)adipimide,
N-(methylthio)adipimide,
N-(ethylthio)adipimide,
N-(propylthio)adipimide,
N-(isopropylthio)adipimide,
N-(n-butylthio)adipimide,
N-(t-butylthio)adipimide,
N-(isobutylthio)adipimide,
N-(sec.-butylthio)adipimide,
N-(n-pentylthio)adipimide,
N-(n-heptylthio)adipimide,
N-(n-hexylthio)adipimide,
N-(n-octylthio)adipimide,
N-(n-dodecylthio)adipimide,
N-(phenylthio)adipimide,
N-(tolylthio)adipimide,
N-(cyclohexylthio)glutarimide,
N-(cyclooctylthio)glutarimide,
N-(cyclopentylthio)glutarimide,
N-(cyclododecylthio)glutarimide,
N-(benzylthio)glutarimide,
N-(methylthio)glutarimide,
N-(ethylthio)glutarimide,
N-(propylthio)glutarimide,
N-(isopropylthio)glutarimide,
N-(n-butylthio)glutarimide,
N-(t-butylthio)glutarimide,
N-(isobutylthio)glutarimide,
N-(sec.butylthio)glutarimide,
N-(n-pentylthio)glutarimide,
N-(n-heptylthio)glutarimide,
N-(n-hexylthio)glutarimide,
N-(n-octylthio)glutarimide,
N-(n-dodecylthio)glutarimide,
N-(phenylthio)glutarimide,
N-(tolylthio)glutarimide,
N-(cyclohexylthio)dimethylglutarimide,
N-(cyclooctylthio)-3,3-dimethylglutarimide,
N-(cyclopentylthio)-3,3-dimethylglutarimide,
N-(cyclododecylthio)3,3-dimethylglutarimide,
N-(benzylthio)-3,3-dimethylglutarimide,
N-(methylthio)-3,3-dimethylglutarimide,
N-(ethylthio)-3,3-dimethylglutarimide,
N-(propylthio)-3,3-dimethylglutarimide,
N-(ispropylthio)-3,3-dimethylglutarimide,
N-(n-butylthio)-3,3-dimethylglutarimide,
N-(t-butylthio)-3,3-dimethylglutarimide,
N-(isobutylthio)-3,3-dimethylglutarimide,
N-(sec.-butylthio)3,3-dimethylglutarimide,
N-(n-pentylthio)-3,3-dimethylglutarimide,
N-(n-heptylthio)3,3-dimethylglutarimide,
N-(n-hexylthio)-3,3-dimethylglutarimide,
N-(n-octylthio)-3,3-dimethylglutarimide,
N-(n-dodecylthio)-3,3-dimethylglutarimide,
N-(phenylthio)-3,3-dimethylglutarimide,
N-(tolylthio)-3,3-dimethylglutarimide,
N-(cyclohexylthio)-7-oxabicyclo[2.2.1]heptane-2,3-dicarboximide,
N-(cyclohexylthio)-7-oxabicyclo[2.2.1]hept-5-ene-2,3-dicarboximide,
N-(cyclohexylthio)hexahydrophthalimide,
1,3-bis(cyclohexylthio)-2-imidazolinone,
1,3-bis(cyclooctylthio)-2-imidazolinone,
1,3-bis(phenylthio)-2-imidazolinone,
1,3-bis-(chlorophenylthio)-2-imidazolinone,
1,3-bis(benzylthio)-2-imidazolinone,
1,3-bis(tolylthio)-2-imidazolinone,
1,3-bis(nitrophenylthio)-2-imidazolinone,
1,3-bis(t-butylthio)-2-imidazolinone,
1,3-bis(methylthio)-2-imidazolinone,
1,3-bis(ethylthio)-2-imidazolinone,
1,3-bis(propylthio)-2-imidazolinone,
1,3-bis(isopropylthio)-2-imidazolinone,
1,3-bis(n-dodecylthio)-2-imidazolinone,
1-(n-dodecylthio)-2-imidazolinone,
N,N'-di(phenylthio)urea,
N,N'-di(cyclohexylthio)urea,
N,N'-di(cyclooctylthio)urea,
N,N'-di(chlorophenylthio)urea,
N,N'-di(benzylthio)urea,
N,N'-di(tolylthio)urea,
N,N'-di(t-butylthio)urea,
N,N'-di(methylthio)urea,
N,N'-di(ethylthio)urea,
N,N'-di(propylthio)urea,
N,N'-di(isopropylthio)urea,
N,N'-di(n-dodecylthio)urea,
N-(cyclohexylthio)maleimide,
N-(cyclooctylthio)maleimide,
N-(phenylthio)maleimide,
N-(chlorophenylthio)maleimide,
N-(tolylthio)maleimide,
N-(nitrophenylthio)maleimide,
N-(benzylthio)maleimide,
N-(t-butylthio)maleimide,
N-(methylthio)maleimide,
N-(ethylthio)maleimide,
N-(propylthio)maleimide,
N-(isopropylthio)maleimide,
N-(n-dodecylthio)maleimide,
cyclohexylthio-3-hydantoin,
1,3-bis(cyclohexylthio)hydantoin,
cyclooctylthio-3-hydantoin,
1,3-bis(cyclooctylthio)hydantoin,
cyclopentylthio)-3-hydantoin,
1,3-bis(cyclopentylthio)hydantoin,
cyclododecylthio-3-hydantoin,
1,3-bis(cyclododecylthio)hydantoin,
phenylthio-3-hydantoin,
1,3-bis(phenylthio)hydantoin,
chlorophenylthio-3-hydantoin,
1,3-bis(chlorophenylthio)hydantoin,
benzylthio-3-hydantoin,
1,3-bis(benzylthio)hydantoin,
tolylthio-3-hydantoin,
1,3-bis(tolylthio)hydantoin,
methylthio-3-hydantoin,
1,3-bis(methylthio)hydantoin,
ethylthio-3-hydantoin,
1,3-bis(ethylthio)hydantoin,
propylthio-3-hydantoin,
1,3-bis(propylthio)hydantoin,
isopropylthio-3-hydantoin,
1,3-bis(isopropylthio)hydantoin,
dodecylthio-3-hydantoin,
1,3-bis(dodecylthio)hydantoin,
5,5-dimethyl-3-(cyclohexylthio)hydantoin,
5,5-dimethyl-3-(cyclooctylthio)hydantoin,
5,5-dimethyl-3-(phenylthio)hydantoin,
5,5-dimethyl-3-(chlorophenylthio)hydantoin,
5,5-dimethyl-3-(benzylthio)hydantoin,
5,5-dimethyl-3-(tolylthio)hydantoin,
5,5-dimethyl-3-(nitrophenylthio)hydantoin,
5,5-dimethyl-3-(t-butylthio)hydantoin, 5,5-dimethyl-3-(methylthio)hydantoin,
5,5-dimethyl-3-(ethylthio)hydantoin,
5,5-dimethyl-3-(propylthio)hydantoin,
5,5-dimethyl-3-(isopropylthio)hydantoin,
5,5-dimethyl-3-(n-dodecylthio)hydantoin,
1,4,5,6,7,7-hexacloro-N-(cyclohexylthio)bicyclo[2.2.1] hept-5-ene-2,3-dicarboximide,
1,4,5,6,7,7-hexachloro-N-(cyclooctylthio)bicyclo[2.2.1] hept-5-ene-dicarboximide,
1,4,5,6,7,7-hexachloro-N-(phenylthio)bicyclo[2.2.1] hept-5-ene-2,3-dicarboximide,
1,4,5,6,7,7-hexachloro-N-(chlorophenylthio)bicyclo-[2.2.1]hept-5-ene-2,3-dicarboximide,
1,4,5,6,7,7-hexachloro-N-(benzylthio)bicyclo[2.2.1] hept-5-ene-2,3-dicarboximide,
1,4,5,6,7,7-hexachloro-N-(tolylthio)bicyclo[2.2.1]hept-5-ene-2,3-dicarboximide,
1,4,5,6,7,7-hexachloro-N-(nitrophenylthio)bicyclo[2.2.1] hept-5-ene-2,3-dicarboximide,
1,4,5,6,7,7-hexachloro-N-(t-butylthio)bicyclo[2.2.1]hept-5-ene-2,3-dicarboximide,
1,4,5,6,7,7-hexachloro-N-(methylthio)bicyclo[2.2.1]hept-5-ene-2,3-dicarboximide,
1,4,5,6,7,7-hexachloro-N-(ethylthio)bicyclo[2.2.1]hept-5-ene-2,3-dicarboximide,
N-(propoylthio)bicyclo[2.2.1]hept-5-ene-2,3-dicarboximide,
1,4,5,6,7,7-hexachloro-N-(isopropylthio)bicyclo[2.2.1] hept-5-ene-2,3-dicarboximide,
1,4,5,6,7,7-hexachloro-N-(n-dodecylthio)bicyclo[2.2.1] hept-5-ene-2,3-dicarboximide,
N-(cyclohexylthio)-4-cyclohexene-1,2-dicarboximide,
N-(cyclooctylthio)-4-cyclohexene-1,2-dicarboximide,
N-(phenylthio)-4-cyclohexene-1,2-dicarboximide,
N-(chlorophenylthio)-4-cyclohexene-1,2-dicarboximide,
N-(benzylthio)-4-cyclohexene-1,2-dicarboximide,
N-(tolylthio)-4-cyclohexene-1,2-dicarboximide,
N-(nitrophenylthio)-4-cyclohexene-1,2-dicarboximide,
N-(t-butylthio)-4-cyclohexene-1,2-dicarboximide,
N-(methylthio)-4-cyclohexene-1,2-dicarboximide,
N-(ethylthio)-4-cyclohexene-1,2-dicarboximide,
N-(propylthio)-4-cyclohexene-1,2-dicarboximide,
N-(n-dodecylthio)-4-cyclohexene-1,2-dicarboximide, and
N-(isopropylthio)-4-cyclohexene-1,2-dicarboximide.
Examples of other new compounds in this invention are
1,3-bis(cyclohexylthio)-2-benzimidazolinone,
1,3-bis(cyclooctylthio)-2-benzimidazolinone,
1,3-bis(phenylthio)-2-benzimidazolinone,
1,3-bis(cyclododecylthio)-2-benzimidazolinone,
1,3-bis(tolylthio)-2-benzimidazolinone,
and mixtures thereof,
1,3-bis(m-tolylthio)-2-benzimidazolinone,
1-phenylthio-2-benzimidazolinone,
1-benzylthio-2-benzimidazolinone,
1-chlorophenylthio-2-benzimidazolinone,
1-nitrophenylthio-2-benzimidazolinone,
1-cyclohexylthio-2-benzimidazolinone,
1-cyclooctylthio-2-benzimidazolinone,
1-tolylthio-2-benzimidazolinone,
1-t-butylthio-2-benzimidazolinone,
1-methylthio-2-benzimidazolinone,
1-ethylthio-2-benzimidazolinone,
1-propylthio-2-benzimidazolinone,
1-isopropylthio-2-benzimidazolinone,
1,3-bis(chlorophenylthio)-2-benzimidazolinone,
1,3-bis(benzylthio)-2-benzimidazolinone,
1,3-bis(nitrophenylthio)-2-benzimidazolinone,
1,3-bis(t-butylthio)-2-benzimidazolinone,
1,3-bis(propylthio)-2-benzimidazolinone,
1,3-bis(methylthio)-2-benzimidazolinone,
1,3-bis(ethylthio)-2-benzimidazolinone,
1,3-bis(isopropylthio)-2-benzimidazolinone,
1,3-bis(n-dodecylthio)-2-benzimidazolinone,
N-phenylthio-3,4,5,6-tetrachlorophthalimide,
N-tolylthio-3,4,5,6-tetrachlorophthalimide,
N-chlorophenylthio)-3,4,5,6-tetraclorophthalimide,
N-benzylthio-3,4,5,6-tetrachlorophthalimide,
N-nitrophenylthio-3,4,5,6-tetrachlorophthalimide,
N-n-butylthio-3,4,5,6-tetrachlorophathlimide,
N-n-dodecylthio-3,4,5,6-tetrachlorophthalimide,
N-cyclohexylthio-3,4,5,6-tetrachlorophthalimide,
N-cyclooctylthio-3,4,5,6-tetrachlorophthalimide,
N-phenylthio-3,4,5,6-tetrabromophthalimide,
N-cyclohexylthio-3,4,5,6-tetrabromophthalimide,
N-(ar-tolylthio)-3,4,5,6-tetrachlorophthalimide,
N-(ar-tolylthio)-3,4,5,6-tetrabromophthalimide,
N-(phenylthio)naphthalimide,
N-(tolylthio)napthalimide,
N-chlorophenylthio-3,4,5,6-tetrachlorophthalimide,
N-(benzylthio)naphthalimide,
N-(nitrophenylthio)naphthalimide,
N-n-butylthio-3,4,5,6-tetrachlorophthalimide,
N-(n-dodecylthio)naphthalimide,
N-(cyclohexylthio)naphthalimide,
N-(cyclooctylthio)naphthalimide, and
N,N'-bis(ar-tolylthio)-1,2,4,5-benzenetetracarboxylic-1,2:4,5-diimide.

Further examples are 1,3-bis(cyclohexylthio)-2-imidazolidinone,
1,3-bis(cyclooctylthio)-2-imidazolidinone,
1,3-bis(cyclododecylthio)-2-imidazolidinone,
1,3-bis(phenylthio)-2-imidazolidinone,
1,3-bis(chlorophenylthio)-2-imidazolidinone,
1,3-bis(benzylthio)-2-imidazolidinone,
1,3-bis(tolylthio)-2-imidazolidinone,
1,3-bis(nitrophenylthio)-2-imidazolidinone,
1,3-bis(t-butylthio)-2-imidazolidinone,
1,3-bis(ethylthio)-2-imidazolidinone,
1,3-bis(methylthio)-2-imidazolidinone,
1,3-bis(propylthio)-2-imidazolidinone,
1,3(isopropylthio)-2-imidazolidinone
1,3-bis(n-dodecylthio)-2-imidazolidinone,
1-(n-dodecylthio)-2-imidazolidinone, and
N[(alpha-chlorocyclohexyl)thio]phthalimide.

The new compounds claimed in R. W. Radue's copending U.S. application, Ser. No. 459,448, now U.S. Pat. 3,410,864 granted Nov. 12, 1968, are useful as premature vulcanization inhibitors. They are 1,3-bis(trichloromethylthio)-2-benzimidazolinone,
1-trichloromethylthio-2-benzimidazolinone,
1,3-bis(trichloromethylthio)-5,6-dichloro-2-benzimidazolinone, and
1,3-bis(trichloromethylthio)-5-chloro-2-benzimidazolinone.

Known compounds useful as premature vulcanization inhibitors in the practice of our invention include, for example, N,N'-di(nitrophenylthio)urea,
N-(phenylthio)phthalimide,
N-(p-chlorophenylthio)phthalimide,
N-(o-tolylthio)phthalimide,
N-(m-tolylthio)phthalimide,
N-(o-nitrophenylthio)phthalimide,
N-(p-chlorophenylthio)succinimide,
N-(o-tolylthio)succinimide,
N-(m-tolylthio)succinimide,
N-(p-tolylthio)succinimide,
N-(t-butylthio)succinimide,
N-(phenylthio)succinimide,
N-(nitrophenylthio)succinimide,
N-(n-dodecylthio)succinimide,
N-(benzylthio)succinimide,
N-[(trichloromethyl)thio]phthalimide,
1,4,5,6,7,7-hexachloro-N-(trichloromethylthio)bicyclo-[2.2.1]hept-5-ene-2,3-dicarboximide,
5,5-dimethyl-3-[(trichloromethyl)thio]hydantoin,
5,5-diphenyl-3-[(trichloromethyl)thio]hydantoin,
N-[(trichloromethyl)thio]maleimide,
N-[(trichloromethyl)thio]-4-cyclohexene-1,2- dicarboximide, and
N-[(trichloromethyl)thio]succinimide.

Further examples of the compounds useful as premature vulcanization inhibitors in this invention are N-(naphthylthio)phthalimide,
N-(n-butylthio)succinimide,
N-(methylthio)succinimide,
N-(ethylthio)succinimide,
N-(propylthio)succinimide,
N-(isopropylthio)succinimide,
N-(cyclohexylthio)succinimide, and
N-(cyclooctylthio)succinimide;
1,3-bis(n-hexylthio)-1,3-dicyclohexyl-urea,
N-phenyl-N'-(phenylthio)urea,
N-phenyl-N'-(methylthio)urea,
N-phenyl-N'-(ethylthio)urea,
N-phenyl-N'-(propylthio)urea,
N-phenyl-N'-(isopropylthio)urea,
N-phenyl-N'-(t-butylthio)urea,
N-phenyl-N'-(n-dodecylthio)urea,
N-phenyl-N'-cyclohexylthio)urea,
N-phenyl-N'-(cyclooctylthio)urea,
N-methyl-N'-(phenylthio)urea,
N-ethyl-N'-(phenylthio)urea,
N-propyl-N'-(phenylthio)urea,
N-isopropyl-N'-(phenylthio)urea,
N-t-butyl-N'-(phenylthio)urea),
N-cyclooctyl-N'-(phenylthio)urea,
N-cyclohexyl-N'-(phenylthio)urea,
N-n-dodecyl-N'-(phenylthio)urea, and variations thereof; and
N-(cyclododecylthio)succinimide.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, peroxide-vulcanizing agents, organic accelerators for vulcanization, an antidegradants, none being the inhibitor used. For the purposes of this invention, sulfurvulcanizing agent means elemental sulfur or sulfur containing vulcanizing agent, for example, an amide disulfide or a polymeric polysulfide. The invention is applicable to vulcanization accelerators of various classes. For example, rubber mixes containing the aromatic thiazole accelerators which include benzothiazyl-2-monocyclohexyl sulfenamide,
2-mercaptobenzothiazole,
N-tert-butyl-2-benzothiazole sulfenamide,
2-benzothiazolyl diethyldiehiocarbamate, and
2-(morpholinothio)benzothiazole can be used. Amine salts of mercaptobenzothiazole accelerators, for example, the t-butyl amine salt of mercaptobenzothiazole, like parts of morpholine, and 2,6-dimethyl morpholine, can be used in the invention. Thiazole accelerators other than aromatic can be used. Stocks containing accelerators, for example, the tetramethylthiuram disulfide, tetramethylthiuram monosulfide, aldehyde amine condensation products, thiocarbamylsulfenamides, thioureas, xanthates, and guanidine derivatives, are substantially improved using the process of our invention. Examples of thiocarbamylsulfenamide accelerators are shown in U.S. Pats. 2,381,392, Smith assigned to Firestone, 2,388,236, Cooper assigned to Monsanto; 2,424,921, Smith assigned to Firestone; and British Pat. 880,912, Dodson assigned to Imperial Chemical Industries Limited.

The invention is applicable to accelerator mixtures. The invention is applicable to stocks containing amine antidegradants. Rubber mixes containing antidegradants, for example, N - 1,3-dimethylbutyl-N'-phenyl-p-phenylenediamine, N,N'-bis(1,4-dimethylpentyl)-p-phenylenediamine, and other phenylenediamines, ketone, ether, and hydroxy antidegradants and mixtures thereof, are substantially improved using the process of our invention. Mixtures of antidegradants, for example, a mixture of N-1,3-dimethylbutyl-N'-phenyl-p-phenylenediamine and N,N'-bis(1,4-dimethylpentyl)-p-phenylenediamine, furnish a much improved final product when used with the inhibitors of this invention.

The inhibitors of our invention can be used in natural and synthetic rubbers and mixtures thereof. Synthetic rubbers that can be improved by the process of this invention include cis-4-polybutadiene, butyl rubber ethylene-propylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. The invention relates to diene rubbers, and the terms rubber and diene rubber are synonymous for the purpose of this invention.

The new compound of this invention are prepared as follows:

To prepare N-(cyclohexylthio)phthalimide 23.2 grams (0.2 mole) of cyclohexylmercaptan is dissolved in 150 ml. of n-pentane, then 14.2 grams (0.2 mole) of anhydrous chlorine gas is pasesd through this solution at 0° to 5° C. over a 25 minute period. The resulting sulfenyl chloride solution is added dropwise over a thirty minute period to a solution of 29.4 grams (0.2 mole) of phthalimide and 27.0 grams (0.27 mole) of triethylamine in 120 ml. of dimethylformamide. The reaction temperature rises from about 25° C. to about 39° C. The reaction mixture is allowed to cool. Then it is diluted with two liters of ice cold water. A white crystalline product precipitates. The yield is quantitative. The melting point of the N-(cyclohexylthio)phthalimide is 89°–91° C. After recrystallization of a sample of the product, the melting point is 93°–94° C. Iodometric titration of the crystallized N-(cyclohexylthio)phthalimide shows 99% purity. Analysis of the product shows 5.48% nitrogen and 12.14% sulfur. Calculated percentages for $C_{14}H_{15}NO_2S$ are 5.36% nitrogen and 12.26% sulfur. The new cycloalkyl and alkyl compounds listed supra are prepared in a similar manner with comparable results.

To prepare 1,3-bis(phenylthio)-2-imidazolidinone, a solution of 8.6 grams (0.1 mole) of 2-imidazolidinone, 25.0 grams (0.25 mole) of triethylamine and 200 ml. of dimethylformamide (DMF) is cooled to 0° C. in a 500 ml. three-necked reaction flask equipped with a mechanical stirrer and thermometer. To this solution there is added 28.8 grams (0.2 mole) of benzene sulfenyl chloride dissolved in 77 ml. of $CCl_4$ dropwise, controlling the temperature with external cooling during the addition. The triethylamine salt precipitates from solution. The reaction slurry is transferred to a 4.0 liter beaker, and with vigorous stirring there is added 3.0 liters of ice water to precipitate an oil. The oily product is dissolved in ether and separated from the water phase. The ether layer is washed two times with 300 ml. of water. After separation, anhydrous sodium sulfate is added to the ether layer to dry residual water from the product. The solution is filtered to remove the sodium sulfate and the ether is allowed to evaporate to give a dark brown solid. This material is recrystallized from alcohol to yield a white solid which melts at 77°–78° C. Analysis of the product shows 8.96% nitrogen and 21.14% sulfur. Calculated percentages for $C_{15}H_{14}N_2OS_2$ are 9.30% nitrogen and 21.20% sulfur. The infrared spectrum is consistent with the proposed structure. The new imidazolidinones listed, supra, are prepared in as similar manner with comparable results.

To prepare N,N'-di(phenylthio)urea, a solution of 6.0 grams (0.1 mole) of urea and 25.0 grams (0.25 mole) of triethylamine in 200 ml. of DNF is cooled to −10° C. in a three-necked 500 ml. flask equipped with a mechanical stirrer and thermometer. To this solution is added slowly 28.8 grams (0.2 mole) of benzene sulfenyl chloride dissolved in 77 ml. carbon tetrachloride. During the addition the temperature is allowed to increase to 5° C. and a slurry of the triethylamine salt forms. This slurry is transferred to a 4.0 litter beaker and the product is precipitated by the addition of 3.0 liters of ice water with vigorous stirring. The brown solid is collected by filtration and upon recrystallization from ethanol yields a tan powder which melts at 104°–105° C. Analysis of the product shows 9.58% nitrogen and 23.13% sulfur. Calculated percentages for $C_{13}H_{12}N_2OS_2$ are 9.60% nitrogen and 22.00% sulfur. The infrared spectrum is consistent with the proposed structure. The new ureas listed, supra, are prepared in a similar manner with comparable results.

N-(phenylthio)maleimide is prepared in the following manner: 14.4 grams of benzene sulfenyl chloride is added slowly at 15°–20° C. to a mixture of 9.8 grams (0.1 mole) of maleimide and 20.0 grams (0.2 mole) of triethylamine dissolved in 200 ml. of dry benzene in a three-necked 500 ml. reaction flask equipped with a mechanical stirrer and thermometer. The reaction mixture is allowed to stir until it reaches room temperature. This requires about 30 minutes. The triethylamine salt is collected by filtration, and the cake is washed with 100 ml. of benzene. The filtrate is evaporated under reduced pressure until the product starts to precipitate from solution. The slurry is transferred to a 4.0 liter beaker and 3.0 liters of heptane is added with vigorous stirring. This precipitates the remaining product which is collected by filtration and washed with cold heptane. The product is allowed to dry overnight at room temperature. There is obtained 12.0 grams of product which, upon recrystallization from ethanol, has a melting point of 81°–82° C. The infrared spectrum is consistent with the proposed structure. The new maleimides listed, supra, are prepared in a similar manner with comparable results.

N-(phenylthio) - 4 - cyclohexene-1,2-dicarboximide is prepared in the following manner: 14.4 grams (0.1 mole) of benzene sulfenyl chloride dissolved in 30.0 grams of carbon tetrachloride is added slowly to a mixture of 14.9 grams (0.1 mole) of 4 - cyclohexene-1,2-dicarboximide and 12.0 grams (0.12 mole) of triethylamine in 250 ml. of benzene at 15° C. in a 500 ml. three-necked flask equipped with a stirrer and thermometer. The temperature is controlled at 15° C. with external cooling during the addition of the benzene sulfenyl chloride. The reaction is then allowed to warm to room temperature and the triethylamine salt is removed by filtration, washed with a small amount of benzene and 200 ml. of heptane is added to the filtrate to precipitate the product. The benzene and heptane are removed under reduced pressure. There is obtained 25.2 grams of a white solid which melts at 105°–108° C. The product is recrystallized from carbon tetrachloride and has a melting point of 121°–122.5° C. Analysis shows 5.29% nitrogen and 11.69% sulfur. Calculated percentages for $C_{14}H_{13}NO_2S$ are 5.42% nitrogen and 12.39% sulfur. The new 4-cyclohexene-1,2-dicarboximides listed, supra, are prepared in a similar manner with comparable results.

The new 5,5-dimethylhydantoins and 1,4,5,6,7,7-hexachlorobicyclo[2.2.1] hept-5-ene-2,3-dicarboximides listed, supra, are prepared in a similar manner to N-(phenylthio)-4-cyclohexene-1,2-dicarboximide with comparable results.

1,3-bis(phenylthio) - 2 - benzimidazolinone is prepared in the following manner: 28.8 grams (0.2 mole) of benzene sulfenyl chloride dissolved in 31.2 grams of $CCl_4$ is added in one portion to a well-stirred solution of 13.4 grams (0.1 mole) of 2-hydroxybenzimidazole dissolved in 250 ml. of DMF cooled to 0° C. The temperature is maintained between 0° to 5° C. by cooling with an external acetone/ice bath. To the resulting solution over a 15-minute period is added slowly 25.0 grams (0.25 mole) of triethylamine. Upon addition of all the amine, the resulting reddish slurry is transferred to a 4.0 liter beaker with vigorous stirring, and the reaction is quenched by the addition of 3.0 liters of ice water. The amine salt is dissolved and a thick viscous oil results. After decanting the water away from the oil layer, the latter solidifies to give a red solid. This material is recrystallized from ethyl acetate to yield 15.0 grams of a white solid, melting point 115°–117° C. The infrared spectrum is consistent with the proposed structure. Analysis of the product shows 7.98% nitrogen and 18.12% sulfur. Calculated percentages for $C_{19}H_{14}N_2OS_2$ are 7.98% nitrogen and 18.39% sulfur.

The reaction product of 2-hydroxybenzimidazole with the sulfenyl chloride from mixed thiocresols is prepared in the same manner as the 1,3-bis(phenylthio) - 2 - benzimidazolinone. The semisolid obtained is recrystallized from ethanol to give 15.0 grams of a cream solid which melts from 115.5°–125° C. The infrared spectrum is consistent with the proposed structure. Analysis of this product shows 6.94% nitrogen and 16.04% sulfur. Calculated percentages for $C_{21}H_{18}N_2OS_2$ are 7.44% nitrogen and 16.97% sulfur. 1,3-bis(chlorophenylthio) - 2 - benzimidazolinone, 1,3 - bis(benzylthio) - 2 - benzimidazolinone, 1,3 - bis(nitrophenylthio) - 2 - benzimidazolinone, 1,3 - bis(t-butylthio) - 2 - benzimidazolinone, and 1,3-bis(m-tolylthio)-2-benzimidazolinone are prepared in the same manner as the 1,3-bis(phenylthio)-2-benzimidazolinone described above.

N-(phenylthio)bicyclo[2.2.1] hept-5-ene-2,3-dicarboximide is prepared in the following manner: To a mixture of 16.3 grams (0.1 mole) of the imide of bicyclo[2.2.1] hept-5-ene-2,3-dicarboxylic anhydride and 11.1 grams (0.11 mole) of triethylamine in 300 ml. of benzene, there is added dropwise with stirring 0.105 mole of benzene sulfenyl chloride as a carbontetrachloride solution over a 30 minute period. The temperature of the mixture is maintained at 30° C. during the addition. The reaction mixture is stirred an additional 10 minutes after the sulfenyl chloride solution is added. The reaction mixture is filtered to remove triethylamine hydrochloride and the filtrate is added to 3.5 liters of chilled heptane. A white solid is obtained weighing 17.6 grams. A sample of the N-phenylthio)bicyclo[2.2.1] hept-5-ene-2,3-dicarboximide melts at 123°–125° C. Analysis shows 5.37% nitrogen and 11.09% sulfur. Calculated percentages for

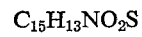

$$C_{15}H_{13}NO_2S$$

are 5.16% nitrogen and 11.80% sulfur. N-phenylthionaphthalimide, N-phenylthio-3,4,5,6-tetrachlorophthalimide, N-phenylthio-3,4,5,6-tetrabromophthalimide, and similar compounds are prepared in a similar manner to N-(phenylthio)bicyclo[2.2.1] hept-5-ene-2,3-dicarboximide with comparable results.

N,N' - bis(phenylthio) - 1,2,3,4-benzenetetracarboxylic-1,2:4,5-diimide is prepared in the following manner: To a solution of 21.6 grams (9.1 mole) of pyromellitic bis-dicarboximide and 22.2 grams (0.22 mole) of triethylamine in 300 ml. of dimethylformamide, there is added dropwise with stirring 0.21 mole of benzene sulfenyl chloride as a carbontetrachloride solution. The temperature is maintained at 20° to 30° C. Three liters of ice water is added to the resulting slurry to precipitate the product. The N,N'-bis(phenylthio)-1,2,4,5-benzenetetracarboxylic-1,2:4,5-diimide product is a yellow solid. A sample of the product melts at 260° C. Analysis of the product shows 6.05% nitrogen and 14.60% sulfur. Calculated percentages for $C_{22}H_{12}N_2O_4S_2$ are 6.48% nitrogen and 14.82% sulfur. N,N'-bis(ar-tolylthio)-1,2,4,5-benzenetetracarboxylic-1,2:4,5-diimide and similar compounds are prepared in a similar manner with comparable results.

N-(cyclohexylthio)glutarimide is prepared in the following manner: Twenty grams (0.177 mole) of glutarimide is added in one portion to a mixture of 24 grams (0.24 mole) of triethylamine and 200 ml. of dimethylformamide. To the resulting solution, 26.5 grams (0.177 mole) of cyclohexylsulfenyl chloride dissolved in 150 ml. of n-pentane is added dropwise over a 30 minute period. The temperature of the reaction increases from about 23° C. to 40° C. during the addition. The resulting slurry is stirred for an additional 30 minutes and then transferred to a 3.0 liter beaker. Two liters of cold water is then added to the slurry with vigorous stirring, and a light tan precipitate is formed. The solid is collected by filtration and allowed to dry at room temperature. The tan solid is recrystallized twice from heptane to yield long white needles which melt at 83°–85° C. Analysis of the product shows 13.70% sulfur and 6.02% nitrogen. Calculated percentages for $C_{11}H_{17}NO_2S$ are 14.13% sulfur and 6.16% nitrogen.

Other glutarimides and 3,3-dimethylglutarimide compounds of this invention are prepared in a similar manner with comparable results. Analysis of N-(cyclohexylthio)-3,3-dimethylglutarimide shows 12.25% sulfur and 5.34% nitrogen. Calculated percentages for $C_{13}H_{21}NO_2S$ are 12.57% sulfur and 5.5% nitrogen.

The following tables illustrate the invention in greater detail and the best mode for carrying it out, but are not to be construed as to narrow the scope of our invention. For all the rubber stocks tested and described, infra, as illustrative of the invention, Mooney scorch times at 121° C. and 135° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the stocks at 144° C., and in some cases 153° C. Curing characteristics are determined by means of the Monsanto Oscillating Disc Rheometer described by Decker, Wise, and Guerry in Rubber World, December 1962, page 68. From the Rheometer data, R.M.T. is the maximum torque in Rheometer units, $t_3$ or $t_2$ is the time in minutes for a rise of three or two Rheometer units, respectively, above the minimum reading and $t_{90}$ is the time required to obtain a torque 90% of the maximum.

The trademarks of some compounds used in the practice of this invention are Santocure MOR, Santoflex 77, Santocure NS, DPG, Thiofide, and Vultrol. Santocure MOR is the accelerator 2-(morpholinothio)benzothiazole. Santoflex 77 is the antidegradant N,N'-bis(1,4-dimethylpentyl)-p-phenylenediamine. Santocure NS is the accelerator N-tert-butyl-2-benzothiazolesulfenamide. DPG is an accelerator reported to be diphenylguanidine. Thiofide is an accelerator reported to be benzothiazyl disulfide. Vultrol is a vulcanization retarder reported to be N-nitrosodiphenylamine.

Table I illustrates the results of using N-(phenylthio)succinimide and N-(benzylthio)succinimide as premature vulcanization inhibitors in stocks of natural rubber containing the antioxidant Santoflex 77 and the accelerator Santocure MOR. From the data of Table I it will be noted that N-(phenylthio)succinimide and N-(benzylthio) succinimide are quite active in the presence of the accelerator as premature vulcanization inhibitors. From the intermittent ozone test, there appears to be no effect on the ozone resistance of the vulcanizates containing the inhibitors.

TABLE I

|  | Stocks | | |
| --- | --- | --- | --- |
|  | A | B | C |
| Natural rubber | 100 | 100 | 100 |
| High abrasion furnace black | 50 | 50 | 50 |
| Zinc oxide | 5 | 5 | 5 |
| Stearic acid | 3 | 3 | 3 |
| Hydrocarbon softener | 10 | 10 | 10 |
| Sulfur | 2.5 | 2.5 | 2.5 |
| Santoflex 77 | 3 | 3 | 3 |
| Santocure MOR | 0.5 | 0.5 | 0.5 |
| N-(Phenylthio)succinimide |  | 1.0 |  |
| N-(Benzylthio)succinimide |  |  | 1.0 |
| Mooney Scorch at 121° C.: |  |  |  |
| $t_5$ | 20.8 | 44.0 | 40.6 |
| $t_{35-5}$ | 4.1 | 4.6 | 4.5 |
| Percent increase in scorch delay |  | 111 | 95 |
| Shore A hardness | 58 | 60 | 58 |
| Modulus 300, p.s.i. | 1,900 | 1,930 | 1,930 |
| Ultimate tensile strength, p.s.i. | 3,600 | 3,600 | 3,600 |
| Ultimate elongation, percent | 490 | 490 | 480 |
| Rheometer at 144° C.: |  |  |  |
| $t_3$ | 7.2 | 13.3 | 14.0 |
| $t_{90}$ | 19.0 | 26.2 | 6.8 |
| $k_1$ [1] | .025 | .005 |  |
| $k_2$ | .173 | .173 | .165 |
| Intermittent ozone [2]: |  |  |  |
| Hours 90% retention | 16 | 13 | 15 |
| Hours 80% retention | 31 | 30 | 32 |

[1] $k$ is a specific rate constant measured in reciprocal minutes. See Coran, 37 Rubber Chemistry and Technology 689 (1964).
[2] For method see Decker & Wise, Rubber World, April 1962, p. 66.

In Table II it is shown that N-(phenylthio)succinimide functions as an inhibitor in natural rubber with Santocure NS as well as it did with the accelerator Santocure MOR. It is also shown in Table II that 0.25 part per hundred N-(phenylthio)succinimide with Santocure NS has about the same vulcanization characteristics as 1.0 part per hundred of the well-known retarder Vultrol with Santocure MOR. It is shown that increasing concentrations of N-(phenylthio)succinimide with Santocure NS does not inhibit the rate of crosslink formation as measured by the specific rate constant $k_2$. The parameter $k_2$ is actually increased with increasing amounts of N-(phenylthio)succinimide in the presence of the phenylenediamine antidegradants. Stocks containing N-(phenylthio)succinimide and Santocure NS also show an excellent rate of cure after the onset of vulcanization.

The code for Table II is as follows. The stocks contain:

|  | Parts |
| --- | --- |
| Natural rubber | 100 |
| High abrasion furnace black | 50 |
| Zinc oxide | 5 |
| Stearic acid | 3 |
| Hydrocarbon softener | 3 |
| Antidegradant | 3 |
| Accelerator | 0.5 |
| Premature vulcanization inhibitor | As indicated |
| Sulfur | 2.5 |

Twelve stocks were tested. The stocks include the following:

Stock No.:
1 -------- Santocure MOR plus Santoflex 77.
2 -------- Santocure MOR plus Santoflex 77 plus Vultrol (1.0 part).
3 -------- Santocure NS plus Santoflex 77.
4 -------- Santoflex NS plus Santoflex 77 plus N-(phenylthio) succinimide (0.25 part).
5 -------- Santocure NS plus Santoflex 77 plus N-(phenylthio) succinimide (0.5 part).
6 -------- Santocure NS plus Santoflex 77 plus N-(phenylthio) succinimide (1.0 part).
7 -------- Santocure MOR plus N-1, 3-dimethylbutyl-N'-phenyl-p-phenylenediamine.
8 -------- Santocure MOR plus N-1, 3-dimethylbutyl-N'-phenyl-p-phenylenediamine plus Vultrol (1.0 part).
9 -------- Santocure NS plus N-1, 3-dimethylbutyl-N'-phenyl-p-phenylenediamine.
10 -------- Santocure NS plus N-1, 3-dimethylbutyl-N'-phenyl-p-phenylenediamine plus N-(phenylthio)succinimide (0.25 part).
11 -------- Santocure NS plus N-1, 3-dimethylbutyl-N'-phenyl-p-phenylenediamine plus N-(phenylthio)succinimide (0.5 part).
12 -------- Santocure NS plus N-1, 3-dimethylbutyl-N'-phenyl-p-phenylenediamine plus N-(phenylthio)succinimide (1.0 part).

TABLE II

| Stock | 1 | 2 | 3 | 4 | 5 | 6 | 7 | 8 | 9 | 10 | 11 | 12 |
|---|---|---|---|---|---|---|---|---|---|---|---|---|
| Mooney scorch at 121° C.: | | | | | | | | | | | | |
| $t_5$ | 20.3 | 28.0 | 23.9 | 27.5 | 32.7 | 43.0 | 40.6 | 48.6 | 37.6 | 47.4 | 56.0 | 70.5 |
| Percent increase in scorch delay | | 38.0 | | 11.0 | 37.0 | 80.0 | | 20.0 | | 26.0 | 49.0 | 88.0 |
| Rheometer at 144° C.: | | | | | | | | | | | | |
| $t_3$ | 7.5 | 9.6 | 8.2 | 9.2 | 10.8 | 12.4 | 10.2 | 12.7 | 10.8 | 12.8 | 15.3 | 17.5 |
| $t_{90}$ | 18.7 | 20.8 | 19.0 | 21.0 | 21.5 | 23.2 | 23.8 | 27.0 | 23.0 | 25.0 | 28.5 | 31.0 |
| $k_1$ | .025 | .007 | .026 | .020 | .016 | .099 | .013 | .002 | .017 | .009 | .005 | .003 |
| $k_2$ | .183 | .216 | .178 | .173 | .173 | .183 | .154 | .210 | .150 | .165 | .165 | .168 |

Results comparable to the natural rubber preparations of Table II are obtained using cis-4-polybutadiene, butyl rubber, ethylene-propylene terpolymers, polymers of 1,3-butadiene, for example, 1,3-butadiene itself and of isoprene and copolymers of 1,3-butadiene with other monomers, for example, styrene, acrylonitrile, isobutylene, and methyl methacrylate as the base stock and N-(phenylthio)succinimide and N-(benzylthio)succinimide as the inhibitor. For example, Table III shows the premature vulcanization inhibitor properties of N-(phenylthio)succinimide in a styrene-butadiene rubber B-5 masterbatch. The compound is compared with Vultrol in several systems. The code for Table III is as follows. A B-5 masterbatch is composed of:

|  | Parts |
|---|---|
| Oil-extended styrene-butadiene rubber containing 37.5% highly aromatic oil | 137.5 |
| Intermediate super abrasion furnace black | 68.5 |
| Zinc oxide | 3.0 |
| Stearic acid | 2.0 |

The stocks also contain:

| | |
|---|---|
| Antidegradant N-1,3 - dimethylbutyl-N'-phenyl-p-phenylenediamine | 3.0. |
| Premature vulcanization inhibitor | As indicated below. |
| Accelerator | 1.2 or as indicated below. |
| Sulfur | 2.0. |

Ten stocks were tested. The stocks include the following:

Stock No.:
1. Santocure MOR.
2. Santocure NS.
3. Vultrol (1.0 part) plus Santocure MOR.
4. Vultrol (1 part) plus Santocure NS.
5. N-(phenylthio)succinimide (0.25 part) plus Santocure NS.
6. N-(phenylthio)succinimide (0.5 part) plus Santocure NS.
7. N-(phenylthio)succinimide (1 part) plus Santocure NS.
8. N-(phenylthio)succinimide (1 part) plus Santocure MOR.
9. Benzothiazyl disulfide (1 part) plus diphenylguahidine (0.7 part).
10. N-(phenylthio)succinimide (1 part) plus benzothiazyl disulfide (1 part) plus diphenylguanidine (0l7 part).

TABLE III

| Stock | 1 | 2 | 3 | 4 | 5 | 6 | 7 | 8 | 9 | 10 |
|---|---|---|---|---|---|---|---|---|---|---|
| Mooney Scorch at 135° C.: | | | | | | | | | | |
| $t_5$ | 26.9 | 20.6 | 30.0 | 20.8 | 24.3 | 26.5 | 31.0 | 39.0 | 10.0 | 19.5 |
| Percent increase in scorch delay | | | 11.0 | 0 | 18.0 | 29.0 | 50.0 | 45.0 | | 95.0 |
| Rheometer at 153° C.: | | | | | | | | | | |
| R.M.T | 50.8 | 49.3 | 50.0 | 50.0 | 48.0 | 48.2 | 46.6 | 45.5 | 49.5 | 45.2 |
| $t_3$ | 12.0 | 9.8 | 14.0 | 9.6 | 11.5 | 12.0 | 13.8 | 15.6 | 5.7 | 9.0 |
| $t_{90}$ | 21.7 | 18.0 | 24.0 | 19.0 | 20.0 | 21.2 | 22.5 | 25.3 | 12.7 | 16.0 |

Vultrol, the known inhibitor, shows a mere 11% increase in scorch delay with Santocure MOR and no increased delay with Santocure NS. But the compound of our invention, at the same concentrations, shows a 45% increase in scorch delay with Santocure MOR and a 50% increase with Santocure NS in styrene-butadiene rubber.

Table IV shows the premature vulcanization inhibitor properties of N-(phenylthio)succinimide in natural rubber when a peroxide vulcanizing agent is used. N-(phenylthio)succinimide shows a 57% increase in scorch delay with the vulcanizing agent dicumyl peroxide. The masterbatch for Table IV is composed of:

|  | Parts |
|---|---|
| Smoked sheets | 100 |
| High abrasion furnace black | 50 |
| Zinc oxide | 5 |
| Stearic acid | 3 |
| Hydrocarbon softener | 10 |
| Total parts | 168 |

TABLE IV

|  | Parts | |
|---|---|---|
| Masterbatch | 168 | 168 |
| N-1,3-dimethylbutyl-N'-phenyl-p-phenylenediamine | 1.5 | 1.5 |
| Dicumyl peroxide | 2.0 | 2.0 |
| N-(phenylthio)succinimide | | 1.0 |
| Mooney scorch at 135° C.: | | |
| $t_5$ | 4.9 | 7.7 |
| Percent increase in scorch delay | | 57 |

Table V illustrates the excellent results obtained using N-(cyclohexylthio)phthalimide as a premature vulcanization inhibitor in stocks of natural rubber, oil-extended styrene-butadiene rubber and a natural rubber/cis-4-polybutadiene blend tread stock. The natural rubber tread stock is composed of the following:

Natural rubber tread stock

|  | Parts |
|---|---|
| Natural rubber smoked sheets | 100.0 |
| Intermediate super abrasion furnace carbon black | 45.0 |
| Zinc oxide | 3.0 |
| Stearic acid | 2.0 |
| Aromatic oil | 5.0 |
| N-1,3-dimethylbutyl-N'-phenyl-p-phenylenediamine | 2.0 |
| Santocure MOR | 0.5 |
| Sulfur | 2.5 |

The oil-extended styrene-butadiene rubber tread stock is composed of the following:

Oil-extended styrene-butadiene rubber tread stock

|  | Parts |
|---|---|
| Oil-extended styrene-butadiene rubber 1712 | 137.0 |
| Aromatic oil | 1.5 |
| Intermediate super abrasion furnace carbon black | 65.0 |
| Zinc oxide | 3.0 |
| Stearic acid | 1.0 |
| N-1,3-dimethylbutyl-N'-phenyl-p-phenylenediamine | 2.0 |
| Santocure MOR | 1.2 |
| Sulfur | 2.0 |

The natural rubber/cis-4-polybutadiene blend tread is composed of the following:

Natural rubber/polybutadiene blend tread stock

|  | Parts |
|---|---|
| Natural rubber smoked sheets | 75.0 |
| Cis-4-polybutadiene | 25.0 |
| Aromatic oil | 5.0 |
| Zinc oxide | 3.0 |
| Stearic acid | 2.0 |
| Intermediate super abrasion furnace carbon black | 45.0 |
| N-1,3-dimethylbutyl-N'-phenyl-p-phenylenediamine | 2.0 |
| Santocure NS | 0.65 |
| Sulfur | 1.75 |

TABLE V

Natural rubber tread stock, parts

| N-(cyclohexylthio)phthalimide |  | 1.0 |
|---|---|---|
| Mooney scorch at 121° C.: |  |  |
| $t_5$ | 21.2 | 98.3 |
| Percent increase in scorch delay |  | 363.0 |
| Rheometer at 144° C.: |  |  |
| $t_2$ | 7.3 | 22.0 |
| $t_{90}$ | 20.3 | 40.6 |
| R.M.T | 59.0 | 58.0 |
| $k_2$ | .162 | .173 |

Oil-extended styrene-butadiene tread stock, parts

| N-(cyclohexylthio)phthalimide | 0.25 | 0.50 | 1.00 |
|---|---|---|---|
| Mooney scorch at 135° C.: |  |  |  |
| $t_5$ | 30.9 | 42.6 | 53.7 | 70.4 |
| Percent increase in scorch delay |  | 38 | 74 | 128 |
| Rheometer at 153° C.: |  |  |  |
| $t_2$ | 13.8 | 17.8 | 20.0 | 25.0 |
| $t_{90}$ | 25.5 | 31.7 | 35.4 | 41.0 |
| R.M.T | 42.8 | 42.2 | 41.6 | 40.5 |
| $k_2$ | .165 | .168 | .173 | .177 |

Natural rubber/polybutadiene blend tread stock, parts

| N-(cyclohexylthio)phthalimide | 0.1 | 0.2 | 0.4 |
|---|---|---|---|
| Mooney scorch: |  |  |  |
| $t_5$ at 121° C | 35.1 | 55.8 | 68.4 | 86.0 |
| Percent increase in scorch delay |  | 59 | 95 | 145 |
| $t_5$ at 135° C | 15.0 | 23.6 | 28.1 | 36.3 |
| Percent increase in scorch delay |  | 53 | 87 | 142 |

1,3-bis(cyclohexylthio)-2-benzimidazolinone shows a 411% increase in scorch delay over a natural rubber stock containing Santocure MOR alone. These results are calculated from Mooney Scorch Time, $t_5$, at 121° C.

Table VI illustrates the results of using N-(benzylthio)phthalimide and N-(n-dodecylthio)phthalimide in oil-extended styrene-butadiene rubber. The rubber stock is the same as the oil-extended styrene-butadiene rubber stock described for Table V above.

TABLE VI

|  | Parts | | |
|---|---|---|---|
| N-(benzylthio)phthalimide | 0.25 | 0.50 | 1.00 |
| Mooney scorch at 135° C.: |  |  |  |
| $t_5$ | 26.4 | 31.7 | 34.6 | 38.3 |
| Percent increase in scorch delay |  | 20 | 35 | 45 |
| N-(n-dodecylthio)phthalimide | 0.25 | 0.50 | 1.00 |
| Mooney scorch at 135° C.: |  |  |  |
| $t_5$ | 26.4 | 28.8 | 33.9 | 38.1 |
| Percent increase in scorch delay |  | 9 | 28 | 44 |

Table VII shows the results of tests on N-(phenylthio)succinimide, N-(t-butylthio)phthalimide, N,N'-di(phenylthio)urea, 1,3-bis(phenylthio)-2-imidazolinone and N-(phenylthio)maleimide as premature vulcanization inhibitors in rubber. N-(phenylthio)maleimide gives a 174% increase in scorch delay over the control. The rubber mixture of the test is an A-6 masterbatch. An A-6 masterbatch is composed of the following.

|  | Parts |
|---|---|
| Smoked sheets | 100 |
| High abrasion furnace black | 50 |
| Zinc oxide | 5 |
| Stearic acid | 3 |
| Hydrocarbon softener | 10 |
| Total parts | 168 |

All stocks contain three parts Santoflex 77, 0.5 part Santocure MOR, and 2.5 parts sulfur.

TABLE VII

| A-6 masterbatch | 168 | 168 | 168 | 168 | 168 | 168 |
|---|---|---|---|---|---|---|
| N-(phenylthio)succinimide | 1.0 |  |  |  |  |  |
| N-(t-butylthio)phthalimide |  | 1.0 |  |  |  |  |
| N,N'-di(phenylthio)urea |  |  | 1.0 |  |  |  |
| 1,3-bis(phenylthio)-2-imidazolidinone |  |  |  | 1.0 |  |  |
| N-(phenylthio)maleimide |  |  |  |  |  | 1.0 |
| Mooney scorch at 121° C.: |  |  |  |  |  |  |
| $t_5$ | 24.5 | 47.7 | 28.1 | 52.0 | 55.0 | 67.2 |
| Percent increase in scorch delay |  | 98.0 | 17.0 | 112.0 | 124.0 | 174.0 |
| Rheometer at 144° C.: |  |  |  |  |  |  |
| R.M.T | 67.3 | 66.0 | 56.7 | 68.0 | 66.7 | 59.8 |
| $t_3$ | 9.0 | 14.5 | 10.8 | 16.5 | 16.5 | 19.0 |
| $t_{90}$ | 21.5 | 27.4 | 34.2 | 29.2 | 29.2 | 33.0 |

Comparable results are obtained when the accelerator Santocure NS and the antidegradant N-1,3-dimethylbutyl-N'-phenyl-p-phenylenediamine or a mixture of this antidegradant and Santoflex 77 are used. Table VIII shows N-(phenylthio)maleimide as a scorch inhibitor in a B-5 masterbatch of styrene-butadiene rubber.

TABLE VIII

| B-5 masterbatch | 211 | 211 | 211 | 211 |
|---|---|---|---|---|
| Thiofide | 1.4 | 1.4 |  |  |
| DPG | 0.7 | 0.7 |  |  |
| Santocure NS |  |  | 1.4 | 1.4 |
| N-(phenylthio)maleimide | 1.0 |  | 1.0 |  |
| N-1,3-dimethylbutyl-N'-phenyl-p-phenylenediamine | 2 | 2 | 2 | 2 |
| Sulfur | 1.7 | 1.7 | 1.7 | 1.7 |
| Mooney scorch at 135° C | 10.4 | 22.8 | 22.8 | 41.8 |
| Percent increase in scorch delay |  | 119 |  | 83 |
| Rheometer at 153° C.: |  |  |  |  |
| R.M.T | 53.7 | 45.4 | 53.0 | 47.0 |
| $t_2$ | 5.1 | 9.5 | 10.2 | 15.5 |
| $t_{90}$ | 12.2 | 18.0 | 20.7 | 29.0 |

Table IX illustrates the useful premature vulcanization properties in an A-6 rubber masterbatch of N-(isopropylthio)phthalimide and N-(n-butylthio)psthalimide. The stocks contain 2.0 parts N-1,3-dimethylbutyl-N'-phenyl-p-phenylenediamine, 0.5 parts Santocure MOR, and 2.5 parts sulfur.

TABLE IX

| Control |  |  |
|---|---|---|
| N-(isopropylthio)phthalimide | 1.0 |  |
| N-(n-butylthio)phthalimide |  | 1.0 |
| Mooney scorch at 135° C.: |  |  |
| $t_5$ | 12.9 | 37.4 | 37.8 |
| Percent increase in scorch delay |  | 189.0 | 193.0 |
| Rheometer at 144° C.: |  |  |
| $t_2$ | 9.8 | 24.0 | 26.0 |
| $t_{90}$ | 27.0 | 47.5 | 45.0 |
| R.M.T | 55.0 | 57.0 | 56.5 |
| $k_2$ | .138 | .130 | .128 |

In similar tests, N-(sec.-butylthio)phthalimide shows a 212% increase in scorch delay, and 1,3-bis(n-dodecylthio)benzimidazolinone shows a 52% increase in scorch delay.

In an A-6 masterbatch containing 0.5 part Santocure MOR, 2.5 parts sulfur, and 3 parts Santoflex 77, the known compound, N-(phenylthio)phthalimide shows a 108% increase in scorch delay. N-(phenylthio)phthalimide is difficult to disperse in rubber probably due to its high melting point (163°–165° C.).

Table X illustrates the properties of a mixture of ortho-, meta-, and para-N-(tolythio)phthalimide as a premature vulcanization inhibitor in an A-6 masterbatch using the antidegradants, Santoflex 77 and N-1,3-dimethylbutyl-N'-phenyl-p-phenylenediamine. An 81% increase in scorch delay takes place with Santoflex 77 and a 140% increase is noted with N-1,3-dimethylbutyl-N'-phenyl-p-phenylenediamine. All stocks contain 0.5 part Santocure NS and 2.5 parts sulfur. Comparable results are obtained with other antidegradants.

TABLE X

| | | | | |
|---|---|---|---|---|
| A-6 masterbatch | 168 | 168 | 168 | 168 |
| Santoflex 77 | 3 | 3 | | |
| 1,3-dimethylbutyl-N'-phenyl-p-phenylenediamine | | | 3 | 3 |
| N-(tolylthio)phthalimide | 1.0 | | 1.0 | |
| Mooney scorch at 121° C.: | | | | |
| $t_5$ | 24.1 | 44.0 | 35.4 | 84.2 |
| Percent in scorch delay | | 82.0 | | 140.0 |
| Rheometer at 144° C.: | | | | |
| R.M.T | 66.6 | 66.0 | 64.7 | 65.0 |
| $t_3$ | 8.1 | 13.0 | 11.5 | 19.5 |
| $t_{90}$ | 19.8 | 25.0 | 25.5 | 34.2 |

1,3-bis(phenylthio)-2-benzimidazolinone is an excellent premature vulcanization inhibitor. In an A-1 masterbatch, this compound increased the scorch delay 170% as shown in Table XI.

An A-1 masterbatch is composed of:

| | Parts |
|---|---|
| Natural rubber | 100 |
| High abrasion furnace black | 50 |
| Stearic acid | 3 |
| Zinc oxide | 5 |
| Hydrocarbon softener | 3 |
| Total parts | 161 |

TABLE XI

| | | |
|---|---|---|
| A-1 masterbatch | 161.0 | 161.0 |
| Sulfur | 2.0 | 2.0 |
| Santocure MOR | 0.5 | 0.5 |
| 1,3-bis(pheaylthio)-2-benzimidazolinone | | 1.0 |
| Santoflex 77 | 3.0 | 3.0 |
| Mooney scorch at 121° C.: | | |
| $t_5$ | 24.3 | 65.8 |
| Percent increase in scorch delay | | 170.0 |
| Rheometer at 144° C.: | | |
| R.M.T | 56.0 | 53.7 |
| $t_3$ | 8.7 | 17.7 |
| $t_{90}$ | 19.5 | 29.5 |

Comparable results are obtained using the accelerator Santocure NS.

1,3-bis(phenylthio)-2-benzimidazolinone, N-(phenylthio)succinimide and 1,3-bis(trichloromethylthio)-2-benzimidazolinone are premature vulcanization inhibitors in cis-4-polybutadiene as shown in Table XII. 1,3-bis(phenylthio)-2-benzimidazolinone shows a 47% increase in scorch delay, N-(phenylthio)succinimide shows a 31% increase, and 1,3-bis(trichloromethylthio)-2-benzimidazolinone shows 14% increase in cis-4-polybutadiene. The masterbatch for Table XII is composed of:

| | Parts |
|---|---|
| Cis-4-polybutadiene | 100 |
| Aromatic extender and process oil | 8 |
| Stearic acid | 2 |
| Santoflex 77 | 3 |
| Xinc oxide | 3 |
| Intermediate super abrasion furnace black | 50 |

TABLE XII

| | | | | |
|---|---|---|---|---|
| Masterbatch | 166 | 166 | 166 | 166 |
| 1,3-bis(trichloromethylthio)-2-benzimidazolinone | | | | 1.0 |
| N-(phenylthio)succinimide | | | 1.0 | |
| 1,3-bis(phenylthio)-2-benzimidazolinone | | 1.0 | | |
| Santocure MOR | 0.6 | 0.6 | 0.6 | 0.6 |
| Sulfur | 2.4 | 2.4 | 2.4 | 2.4 |
| Mooney scorch at 135° C.: | | | | |
| $t_5$ | 15.5 | 17.7 | 20.3 | 22.8 |
| Percent increase in scorch delay | | 14 | 31 | 47 |
| Rheometer at 153° C.: | | | | |
| R.M.T | 58.0 | 78.0 | 61.2 | 57.2 |
| $t_2$ | 7.6 | 8.3 | 8.6 | 9.8 |
| $t_{90}$ | 15.7 | 19.0 | 17.5 | 18.2 |

1,3-bis(phenylthio)-2-benzimidazolinone and N-(phenylthio)succinimide are premature vulcanization inhibitors in ethylene-propylene terpolymer as shown in Table XIII. Ethylene-propylene terpolymer is the recognized and commonly used name for the polymerized product from the polymerization of ethylene propylene and a small quantity of a nonconjugated diene. The terpolymer reported in Table XIII is known commercially as "Nordel 1070." N-(phenylthio)succinimide shows a 28% increase in scorch delay and 1,3-bis(phenylthio)-2-benzimidazolinone shows an 80% increase when used as premature vulcanization inhibitors in ethylene-propylene terpolymer. The masterbatch of Table XIII is composed of:

| | Parts |
|---|---|
| Ethylene-propylene terpolymer | 100 |
| High abrasion furnace black | 80 |
| Zinc oxide | 5 |
| Naphthenic-type oil plasticizer and softener | 40 |

TABLE XIII

| | | | |
|---|---|---|---|
| Master batch | 225 | 225 | 225 |
| Tetramethyl thiuram monosulfide | 1.5 | 1.5 | 1.5 |
| Mercaptobenzothiazole | 0.5 | 0.5 | 0.5 |
| N-(phenylthio)succinimide | | 1.0 | |
| 1,3-bis(phenylthio)benzimidazolinone | | | 1.0 |
| Sulfur | 1.5 | 1.5 | 1.5 |
| Mooney scorch at 135° C.: | | | |
| $t_5$ | 10.9 | 14.9 | 20.5 |
| Percent increase in scorch delay | | 28 | 80 |
| Rheometer at 160° C.: | | | |
| R.M.T | 63.5 | 60.0 | 58.0 |
| $t_2$ | 4.6 | 6.0 | 7.5 |
| $t_{90}$ | 11.7 | 15.2 | 17.5 |

1,3-bis(o-nitrophenylthio)-2-benzimidazolinone shows a 57% increase in scorch delay in an A-6 masterbatch. The results are in Table XIV.

TABLE XIV

| | | |
|---|---|---|
| A-6 masterbatch | 168 | 168 |
| Santoflex 77 | 3.0 | 3.0 |
| Santocure MOR | 0.5 | 0.5 |
| Sulfur | 2.5 | 2.5 |
| 1,3-bis(o-nitrophenylthio)-2-benzimidazolinone | | 1.0 |
| Mooney scorch at 121° C.: | | |
| $t_5$ | 22.8 | 35.9 |
| Percent increase in scorch delay | | 57.0 |
| Rheometer at 144° C.: | | |
| R.M.T | 68.0 | 66.2 |
| $t_3$ | 8.1 | 12.2 |
| $t_{90}$ | 20.8 | 20.5 |

Comparable results are obtained with the inhibitor 1,3-bis-(chlorophenylthio)-2-benzimidazolinone.

An ortho-, meta-, and para-mixture of 1,3-bis(tolylthio)-2-benzimidazolinone gives a 163% increase in scorch delay over the control, and 1,3-bis(m-tolylthio)-2-benzimidazolinone increases the delay 142%. These data are shown in Table XV.

TABLE XV

| | | | |
|---|---|---|---|
| A-6 masterbatch | 168 | 168 | 168 |
| Santoflex 77 | 3.0 | 3.0 | 3.0 |
| Santocure MOR | 0.5 | 0.5 | 0.5 |
| Sulfur | 2.5 | 2.5 | 2.5 |
| o,m,p-Mixture of 1,3-bis(tolylthio)-2-benzimidazolinone | | 1.0 | |
| 1,3-bis(m-tolylthio)-2-benzimidazolinone | | | 1.0 |
| Mooney scorch at 121° C.: | | | |
| $t_5$ | 22.7 | 59.8 | 54.9 |
| Percent increase in scorch delay | | 163.0 | 142.0 |
| Rheometer at 144° C.: | | | |
| R.M.T | 56.9 | 56.3 | 57.0 |
| $t_3$ | 8.8 | 17.5 | 16.2 |
| $t_{90}$ | 20.2 | 29.0 | 27.5 |

The ortho-, meta-, and para-mixture of 1,3-bis(tolythio)-2-benzimidazolinone was tested in a B-5 masterbatch of styrene-butadiene rubber. A 113% increase in scorch delay over the control is obtained with an accelerator mixture of DPG and Thiofide and the inhibitor. The inhibitor gives an 80% increase in scorch delay when used with Santocure NS in styrene-butadiene rubber. These results are shown in Table XVI below.

TABLE XVI

| | | | | |
|---|---|---|---|---|
| B-5 masterbatch | 211 | 211 | 211 | 211 |
| Thiofide | 1.40 | 1.40 | | |
| DPG | 0.7 | 0.7 | | |
| Santocure NS | | | 1.40 | 1.40 |
| N-1,3-dimethylbutyl-N'-phenyl-p-phenylenediamine | 2.0 | 2.0 | 2.0 | 2.0 |
| o,m,p-Mixture of 1,3-bis(tolylthio)-2-benzimidazolinone | | 1.0 | | 1.0 |
| Sulfur | 1.7 | 1.7 | 1.7 | 1.7 |
| Mooney scorch at 135° C.: | | | | |
| $t_5$ | 10.3 | 22.3 | 23.3 | 41.8 |
| Percent increase in scorch delay | | 113 | | 80 |
| Rheometer at 153° C.: | | | | |
| R.M.T | 54.0 | 46.0 | 52.5 | 46.2 |
| $t_2$ | 4.5 | 9.3 | 10.2 | 15.3 |
| $t_{90}$ | 11.5 | 17.8 | 21.3 | 27.8 |

N-phenyl-N'-(phenylthio)urea was tested in an A-6 masterbatch as a premature vulcanization inhibitor and shows a 97% increase in scorch delay over the control. The results are reported in Table XVII.

TABLE XVII

| | | |
|---|---|---|
| A-6 masterbatch | 168 | 168 |
| Sulfur | 2.5 | 2.5 |
| Santocure MOR | 0.5 | 0.5 |
| Santoflex 77 | 3.0 | 3.0 |
| N-phenyl-N'(phenylthio)urea | | 1.0 |
| Mooney scorch at 121° C.: | | |
| $t_5$ | 23.5 | 46.3 |
| Percent increase in scorch delay | | 97 |

Comparable results are obtained when the other unsymmetrical ureas of the invention are tested as premature vulcanization inhibitors.

Table XVIII shows that 1,4,5,6,7,7-hexachloro-N-(trichloromethylthio)bicyclo[2.2.1] - hept - 5 - ene - 2,3-dicarboximide and 1,3-bis(trichloromethylthio)-5,6-dichloro-2-benzimidazolinone are effective premature vulcanization inhibitors.

TABLE XVIII

| | | | |
|---|---|---|---|
| A-1 masterbatch | 161 | 161 | 161 |
| Santocure MOR | 0.5 | 0.5 | 0.5 |
| Sulfur | 2.5 | 2.5 | 2.5 |
| 1,4,5,6,7,7-hexachloro-N-(trichloromethylthio) bicyclo[2.2.]-hept-5-ene-2,3-dicarboximide | | 1.0 | |
| 1,3-bis(trichloromethylthio)-5,6-dichloro-2-benzimidazolinone | | | 1.0 |
| Mooney scorch at 121° C.: | | | |
| $t_5$ | 30.5 | 53.0 | 51.0 |
| Percent increase in scorch delay | | 74.0 | 67.0 |
| Rheometer at 144° C. | | | |
| R.M.T | 70.1 | 70.0 | 70.0 |
| $t_3$ | 7.9 | 12.0 | 12.2 |
| $t_{90}$ | 23.0 | 39.0 | 30.0 |

1,3-bis(trichloromethylthio) - 5 - chloro - 2 - benzimidazolinone shows a 49% increase in scorch delay in natural rubber.

Table XIX shows that N-[(trichloromethyl)thio]-phthalimide is a premature vulcanization inhibitor for natural rubber using Santocure NS and Santocure MOR accelerators with and without the antidegradant Santoflex 77. A 25% increase in scorch delay takes place when N-[(trichloromethyl)thio]phthalimide and Santocure NS are tested with Santoflex 77, but without the antidegradant, a 9% scorch delay occurs. With Santocure MOR accelerator in the presence of Santoflex 77, a 57% increase in the scorch delay occurs. A higher modulus vulcanizate is obtained when this inhibitor is used with Santocure NS or Santocure MOR. Comparable results to those in Table XIX are obtained when the antidegradant N-1,3-dimethylbutyl-N'-phenyl-p-phenylenediamine is used in place of Santoflex 77.

TABLE XIX

| | 1 | 2 | 3 | 4 | 5 | 6 | 7 |
|---|---|---|---|---|---|---|---|
| A-1 masterbatch | 161 | 161 | 161 | 161 | 161 | 161 | 161 |
| Santocure NS | 0.5 | 0.5 | 0.5 | 0.5 | | | |
| Santocure MOR | | | | | 0.5 | 0.5 | 0.5 |
| Sulfur | 2.5 | 2.5 | 2.5 | 2.5 | 2.5 | 2.5 | 2.5 |
| N-[(trichloromethyl)thio] phthalimide | | 1.0 | | 1.0 | | | 1.0 |
| Santoflex 77 | | | 3.0 | 3.0 | | 3.0 | 3.0 |
| Mooney scorch at 121° C.: | | | | | | | |
| $t_5$ | 28.3 | 31.0 | 19.5 | 24.5 | 31.0 | 17.3 | 27.2 |
| Percent increase in scorch delay | | 9 | | 25 | | | 57 |
| Rheometer at 144° C.: | | | | | | | |
| R.M.T | 77.8 | 74.0 | 76.8 | 79.8 | 74.0 | 74.5 | 77.4 |
| $t_3$ | 9.0 | 10.0 | 7.5 | 8.5 | 8.7 | 5.2 | 9.6 |
| $t_{90}$ | 23.0 | 37.0 | 19.5 | 21.8 | 23.0 | 17.8 | 20.0 |

Table XX shows that N-[(trichloromethyl)thio]succinimide is a premature vulcanization inhibitor. With Santocure NS accelerator in the presence of the antidegradant N-1,3 - dimethylbutyl-N'-phenyl-p-phenylenediamine, this inhibitor improves the scorch delay about 43%. Comparable results are obtained when this antidegradant is replaced with Santoflex 77.

TABLE XX

| | 1 | 2 | 3 | 4 | 5 | 6 |
|---|---|---|---|---|---|---|
| A-1 masterbatch | 161 | 161 | 161 | 161 | 16 | 161 |
| Santocure NS | 0.5 | 0.5 | 0.5 | 0.5 | | |
| Santocure MOR | | | | | 0.5 | 0.5 |
| Sulfur | 2.5 | 2.5 | 2.5 | 2.5 | 2.5 | 2.5 |
| N-[(trichloromethyl)thio] succinimide | | 1.0 | | 1.0 | | 1.0 |
| N-1,3-dimethylbutyl-N'-phenyl-p-phenylenediamine | | | 3.0 | 3.0 | | |
| Mooney scorch at 121° C.: | | | | | | |
| $t_5$ | 28.8 | 33.0 | 27 | 38.5 | 32.7 | 47 |
| Percent increase in scorch delay | | 14 | | 43 | | 43 |
| Rheometer at 144° C.: | | | | | | |
| R.M.T | 76.3 | 71.5 | 73.8 | 76.9 | 71.0 | 77.8 |
| $t_3$ | 9.5 | 11.5 | 8.8 | 11.0 | 8.7 | 12.8 |
| $t_{90}$ | 23 | 45 | 21.5 | 32.3 | 21 | 39 |

Table XXI shows that the compounds 1,3-bis(trichloromethylthio) - 2-benzimidazolinone, N-[(trichloromethyl)thio]-4-cyclohexene - 1,2-dicarboximide, 5,5-dimethyl-3-[(trichloromethyl)thio]hydantoin, and N - [(trichloromethyl)thio]maleimide are premature vulcanization inhibitors. In addition to the activity these compounds exhibit as premature vulcanization inhibitors, the rheometer tracings show that the rate of reversion during overcure of natural rubber is reduced.

TABLE XXI

| | 1 | 2 | 3 | 4 | 5 |
|---|---|---|---|---|---|
| A-1 masterbatch | 161 | 161 | 161 | 161 | 161 |
| Santoflex 77 | 3 | 3 | 3 | 3 | 3 |
| Santocure MOR | 0.5 | 0.5 | 0.5 | 0.5 | 0.5 |
| Sulfur | 2.5 | 2.5 | 2.5 | 2.5 | 2.5 |
| N-[(trichloromethyl)thio]-4-cyclohexene-1,2-dicarboximide | | 1.0 | | | |
| 5,5-dimethyl-3-[(trichloromethyl)-thio] hydantoin | | | 1.0 | | |
| N-[(trichloromethyl)thio]-maleimide | | | | 1.0 | |
| 1,3-bis(trichloromethylthio)-2-benzimidazolinone | | | | | 1.0 |
| Mooney scorch at 121° C.: | | | | | |
| $t_5$ | 18.3 | 30.8 | 34.3 | 30.0 | 39.4 |
| Percent increase in scorch delay | | 68.0 | 87.0 | 64.0 | 115.0 |
| Rheometer at 144° C.: | | | | | |
| R.M.T | 74.9 | 76.5 | 79.3 | 75.5 | 82.5 |
| $t_3$ | 6.8 | 9.0 | 10.5 | 9.9 | 12.6 |
| $t_{90}$ | 17.5 | 18.7 | 20.6 | 23.0 | 23.0 |

A material composed of N-[(trichloromethyl)thio]-4-cyclohexane - 1,2-dicarboximide, 50% active on an inert clay filler, shows comparable results to the compound per se when tested as a premature vulcanization inhibitor.

Tables XXII and XXIII shows that the compound N-(cyclohexylthio)glutarimide, N-(cyclohexylthio) - 3,3-dimethylglutarimide, and N - (phenylthio)benzamide are premature vulcanization inhibitors. The compounds are tested in a masterbatch composed of:

| | Parts |
|---|---|
| Smoked Sheets | 100 |
| Intermediate super abrasion furnace black | 45 |
| Zinc oxide | 3 |
| Stearic acid | 2 |
| Aromatic oil plasticizer | 5 |

TABLE XXII

| | Stock | | |
|---|---|---|---|
| | 1 | 2 | 3 |
| Masterbatch | 155 | 155 | 155 |
| Sulfur | 2.5 | 2.5 | 2.5 |
| Santocure MOR | 0.5 | 0.5 | 0.5 |
| N-1,3-dimethylbutyl-N'phenyl-p-phenylenediamine | 2.0 | 2.0 | 2.0 |
| N-(cyclohexylthio)glutarimide | | 1.0 | |
| N-(phenylthio)benzamide | | | 1.0 |
| Mooney scorch at 121° C.: | | | |
| $t_5$ | 35.2 | 85.8 | 85.3 |
| Percent increase in scorch delay | | 144 | 144 |
| Rheometer at 144° C.: | | | |
| R.M.T | 61.0 | 61.2 | 63.8 |
| $t_2$ | 8.7 | 21.3 | 20.0 |
| $t_{90}$ | 27.7 | 42.1 | 39.2 |

TABLE XXIII

| | Stock | |
|---|---|---|
| | 1 | 2 |
| Masterbatch | 155 | 155 |
| Santocure NS | 0.5 | 0.5 |
| Sulfur | 2.5 | 2.5 |
| N-1,3-dimethylbutyl-N'-phenyl-p-phenylenediamine | 2.0 | 2.0 |
| N-(cyclohexylthio)-3,3-dimethylglutarimide | | 0.5 |
| Mooney scorch at 121° C.: | | |
| $t_5$ | 27.6 | 60.5 |
| Percent increase in scorch delay | | 120.0 |
| Rheometer at 144° C.: | | |
| R.M.T | 69.3 | 67.5 |
| $t_2$ | 8.9 | 17.2 |
| $t_{90}$ | 25.4 | 36.2 |

Table XXIV illustrates the use of 1,3-bis(cyclohexylthio)-2-imidazolidinone, 1,3-bis(cyclohexylthio)hydantoin, and 1-cyclohexylthio-2-imidazolidinone in a natural rubber masterbatch composed of the following:

| | Parts |
|---|---|
| Natural rubber | 100 |
| Intermediate super abrasion furnace black | 45 |
| Stearic acid | 2.0 |
| Hydrocarbon softener | 5.0 |
| Sulfur | 2.5 |
| Santocure MOR | 0.5 |
| Zinc oxide | 3.0 |

TABLE XXIV

| | | | | |
|---|---|---|---|---|
| Control | | | | |
| 1,3-bis(cyclohexylthio)-2-imidazolidinone | | 1.0 | | |
| 1-cyclohexylthio-2-imidazolidinone | | | 1.0 | |
| 1,3-bis(cyclohexylthio)hydantoin | | | | 1.0 |
| Mooney scorch at 121° C.: | | | | |
| $t_5$ | 23.5 | 66.3 | 58.5 | 94.9 |
| Percent increase in scorch delay | | 182.0 | 149.0 | 336.0 |
| Rheometer at 144° C.: | | | | |
| R.T.M | 56.5 | 58.8 | 61.5 | 57.0 |
| $t_2$ | 7.0 | 15.0 | 15.0 | 22.0 |
| $t_{90}$ | 18.7 | 35.2 | 31.8 | 38.0 |

Table XXV illustrates the use of 1,3-bis(p-chlorophenylthio)imidazolidinone in a natural rubber masterbatch containing the same ingredients as the masterbatch of Table V.

TABLE XXV

| | | |
|---|---|---|
| Control | | |
| 1,3-bis(p-chlorophenylthio)imidazolidinone | | 1.0 |
| Mooney scorch at 121° C.: | | |
| $t_5$ | 43.3 | 96.9 |
| Percent increase in scorch delay | | 114.0 |
| Rheometer at 144° C.: | | |
| R.T.M | 54.2 | 52.3 |
| $t_2$ | 9.6 | 20.3 |
| $t_{90}$ | 21.0 | 31.0 |

Table XXVI illustrates the use of 1-(n-dodecylthio)-2-imidazolidinone in an A-6 masterbatch containing 2 parts N-1,3-dimethylbutyl-N'-phenyl-p-phenylenediamine, 0.5 parts Santocure MOR, and 2.5 parts sulfur.

TABLE XXVI

| | | |
|---|---|---|
| Control | | |
| 1-(n-dodecylthio)-2-imidazolidinone | | 1.0 |
| Mooney scorch at 121° C.: | | |
| $t_5$ | 46.0 | 99.1 |
| Percent increase in scorch delay | | 116.0 |
| Rheometer at 144° C.: | | |
| R.T.M | 53.3 | 58.1 |
| $t_2$ | 11.5 | 26.0 |
| $t_{90}$ | 29.7 | 45.1 |

Table XXVII shows that comparable results are obtained when the imide moiety is benzimidazolinon-1-yl, benzothiazolinon-1-yl, or benzoxazolinon-1-yl, and that good results are obtained when the imide moiety is 5,5-diphenyl-3-hydantoinyl.

The control stock (1) is stock A of Table I, supra, to which is added 1 part of prevulcanization inhibitor as follows:

Stock No.:
1 _____ None.
2 _____ 3-(trichloromethylthio)-5,5-diphenyl hydantoin.
3 _____ 3-trichloromethyl-2-benzothiazolinone.
4 _____ 1-trichloromethylthio-2-benzimidazolinone.
5 _____ 3-trichloromethylthio-2-benzoxazolinone.

The results for Stock No. 1 are the average values obtained from three separately prepared samples.

TABLE XXVII

| | Stock | | | | |
|---|---|---|---|---|---|
| | 1 | 2 | 3 | 4 | 5 |
| Mooney scorch at 121° C.: | | | | | |
| $t_5$ | 22.1 | 37.5 | 30.8 | 31.1 | 32.1 |
| $t_{35-5}$ | 3.4 | 3.8 | 2.3 | 3.7 | 2.6 |

The imide moiety may, of course, be formed from two independent radicals as in $(A)_2N$—SR where A is acyl derived from a carboxylic acid and R is alkyl, cycloalkyl, or aryl. A is, for example,

where R is alkyl, cycloalkyl, or aryl. Similarly, —SR may be the substituent of a simple amide as in $$A-\overset{H}{N}-SR$$

illustrated in Table XXII or two —SR substituents may be present as in $AN$—$(SR)_2$. Table XXVIII shows the curing characteristics determined by means of the Rheometer with a stock containing $AN$—$(SR)_2$. The control stock (1) is Stock A of Table I, supra, to which is added 1 part by weight of prevulcanization inhibitor as follows:

| Stock | Prevulcanization inhibitor |
|---|---|
| 1 | None. |
| 2 |  |

TABLE XXVIII

| | Stock | |
|---|---|---|
| | 1 | 2 |
| Rheometer at 144° C.: | | |
| $t_2$ | 7.2 | 15.5 |
| $t_{90}$ | 18.0 | 27.2 |
| R.T.M | 54.9 | 56.5 |
| $k_2$ | .183 | .187 |

Compared to Stock A of Table I except that the 3 parts of Santoflex 77 are replaced by 2 parts of N-1,3-dimethylbutyl-N'-phenyl-p-phenylenediamine, addition of 1 part by weight of N-(phenylthio)-1,8-naphthalimide or of N-(2-naphthylthio)phthalimide shows 160% and 175% increase in scorch delay, respectively. These results are calculated from Mooney Scorch Time ($t_5$) at 121° C. Similar results are obtained by replacing naphthylene in naphthalimido with 1,1'-biphenylene.

Comparable results to those in the tables, supra, illustrating utility are obtained with the inhibitors of this invention which are not illustrated.

Concentration studies show the inhibitors of this invention are effective in rubber at concentrations of 0.05 to 5.50 parts per hundred. Concentrations from 0.10 to 3.0 parts per hundred are preferred.

A wide variety of combinations of Santocure NS and N-(phenylthio)succinimide show storage stability in an eight-week oven aging test at 50° C. These combinations are improved vulcanization accelerators in rubber whereby premature vulcanization is effectively inhibited. Effective inhibitor concentrations for the combinations range from 1 to 9 parts of inhibitor. Comparable results are obtained when other accelerator and inhibitor combinations of this invention are tested for stability.

Table XXIX illustrates storage stability improvement for the accelerators Santocure NS and Santocure MOR, when samples of combinations of these accelerators with N - (cyclohexylthio)phthalimide (50:50 blends) are oven aged for 21 days at 50° C., over samples of Santocure NS and Santocure MOR alone. The aged samples are compared to samples which have not been aged.

TABLE XXIX

|  | Assay, 0 days | Assay, 21 days | Decrease in assay |
|---|---|---|---|
| Santocure NS | 99.2 | 97.6 | 1.6 |
| Santocure MOR | 99.4 | 91.6 | 7.8 |
| Santocure NS | 49.3 | 50.0 | None. |
| N-(cyclohexylthio)phthalimide | 49.6 | | |
| Santocure MOR | 46.9 | 47.0 | None. |
| N-(cyclohexylthio)phthalimide | 50.1 | | |

The data in Table XXIX illustrate that there is no decrease in assay for Santocure NS or Santocure MOR when these accelerators are used in the combinations of this invention. Decreases in assay in Santocure NS and Santocure MOR alone are illustrated in the table to be 1.6 for Santocure NS and 7.8 for Santocure MOR.

N-(cyclohexylthio)phthalimide is useful as a stabilizer for styrene-butadiene rubber which has gone through a coagulation step. The styrene-butadiene rubber used is known commercially as SBR–1502. The SBR is prepared for the stabilizer test by adjusting the temperature of 1000 grams of unstabilized SBR latex in a beaker to 45°–50° C. The latex contains about 20% rubber, 79% water, and 1% soap. The initial pH of the latex is about 10. To this is added 335 ml. of 12.5% NaCl solution. The stabilizer to be tested is added in an emulsified form and then 1000 ml. of dilute (0.2%) sulfuric acid is added at a fast-dropping rate during about 20 minutes. As the pH falls during the acid addition, coagulation starts at about pH 9.0–9.5 and continues throughout the acidification. The pH is finally adjusted with 2% sulfuric acid to between about 2 and 4. The mixture is filtered, and the SBR crumbs are washed with water, then dried in a vacuum oven. The dried SBR crumbs are then milled to uniformity, sheeted out at about 0.008″, and air and oven aged. The SBR containing N-(cyclohexylthio)phthalimide is compared to SBR containing the known stabilizer, tris(nonylphenyl)phosphite, and to a blank which is SBR with no stabilizer present. The Mooney viscosity of the three stocks is determined initially and after oven aging at 100° C. for 16, 30, and 48 hours. The results are recorded in Table XXX. The Mooney viscosity is the torque required to turn a rotor embedded in the rubber sample after rotating 4 minutes. The Mooney Viscosity Test has the American Society for Testing and Materials Designation D–1646–63.

TABLE XXX.—MOONEY VISCOSITY

|  | Aging time, hours | | | |
|---|---|---|---|---|
|  | 0 | 16 | 30 | 48 |
| Stocking containing: | | | | |
| Blank | 51 | 104 | 103 | 124 |
| Tris(nonylphenyl)phosphite (1.25 p.p.h.*) | 47.5 | 56.5 | 70 | 89 |
| N-(cyclohexylthio)phthalimide (1.25 p.p.h.*) | 46.5 | 69 | 73 | 88 |

*Parts per hundred.

Comparable results to those in Table XXX are obtained in the other diene rubbers of this invention.

From the foregoing description, it will be appreciated that in the formula

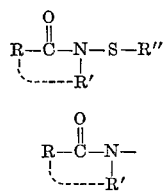

can be a radical derived by removal of hydrogen from an imide of a dicarboxylic acid. The term "imide of a dicarboxylic acid" is used in a configurational sense to indicate two carbonyls joined to a single nitrogen, although more than one such configuration may be present in the same molecule. For example, the mono- and diimides of benzene tetracarboxylic acid are regarded in the present specification and claims as imides of dicarboxylic acids. The hydantoins, uracil, and parabanic acid also fall into the category of imides of dicarboxylic acid. The cyclic ureas, by which are meant monocarbonyl cyclic ureas as distinuished from cyclic ureas containing two carbonyls joined to a single nitrogen, present a configuration the reverse of imides of dicarboxylic acids in that only a single carbonyl is present and is joined to two nitrogen atoms. The preferred radicals conforming to

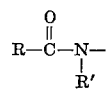

are derived from azoles. By azoles are meant the general class of pentatomic heterocyclic ring compounds whether or not unsaturation is present in the ring. Both the imides of dicarboxylic acids and cyclic ureas include pentatomic heterocyclic ring compounds. Other suitable radicals are derived from monocarbonyl azoles containing one nitrogen atom and one other different hetero atom, for example, sulfur or oxygen, in the ring.

The radicals derived by removal of hydrogen from an imide of a dicarboxylic acid include, for example,

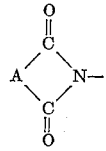

where A is a divalent aliphatic, cycloaliphatic, or aromatic radical. Thus, A is alkylene, cycloalkylene, alkenylene, cycloalkenylene, or arylene. Alkylene radicals belong to the series —$C_nH_{2n}$—. Alkenylene radicals are olefinically unsaturated aliphatic divalent radicals having the valence on separate carbon atoms, for example, propenylene —$CH_2CH=CH$—. The corresponding cyclic forms are cycloalkylene, for example, cyclohexylene —$C_6H_{10}$— and cycloalkenylene, for example, cyclohexenylene —$C_6H_8$—. The divalent aromatic radicals are arylene radicals, for example, phenylene. The radicals derived by removal of hydrogen from a monocarbonyl cyclic urea include, for example,

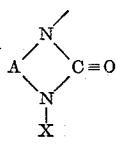

where A has the same meaning as before and X is hydrogen, alkyl, aryl, cycloalkyl, or SR″, R″ being alkyl, aryl, or cycloalkyl.

Suitable acyclic ureas may be represented by the formula

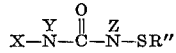

where X, Y, and Z individually are hydrogen, R″, or SR″, R″ being alkyl, aryl, or cycloalkyl as before.

The special case wherein an imido radical is formed from two independent acyl radicals and amide derivatives comprise other valuable classes which may both be represented by the formula

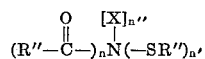

where n, n', and n″ are integers, the sum of which is three, n and n' being one or two, and n″ being zero or one, and R″ and X having the same meaning as before.

It is intended to cover all changes and modifications

We claim:
1. The method of inhibiting premature vulcanization of a vulcanizable diene rubber containing a vulcanizing agent selected from the group consisting of sulfur vulcanizing agents and organic peroxide vulcanizing agents which comprises:

incorporating therein, in an amount effective to inhibit premature vulcanization, a compound selected from the group consisting of the formulas:

(a)
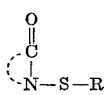

wherein

is a radical derived by removal of hydrogen from an imide of a dicarboxylic acid, from a monocarbonyl cyclic urea, from an imide in which the nitrogen is linked to carbonyl by alkylene, and from a monocarbonyl azole containing one other different hetero atom in the ring, and R is aryl, alkyl, or cycloalkyl, (b)
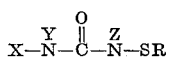

where X, Y, and Z individually are hydrogen, R, or SR, R having the same meaning as before, and (c)
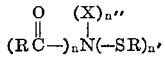

where $n$, $n'$ and $n''$ are integers, the sum of which is three, $n$ and $n'$ being one or two, and $n''$ being zero or one, and R and X having the same meaning as before.

2. The method according to claim 1 where the rubber also contains an organic vulcanization accelerating agent and where the compound to inhibit premature vulcanization is of Formula (a) wherein

is a radical derived by removal of hydrogen from an imide of a dicarboxylic acid which radical has the formula

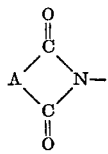

where A is alkylene, cycloalkylene, arylene, alkenylene, or cycloalkenylene.

3. The method according to claim 1 where the rubber also contains an organic vulcanization accelerating agent and where the compound to inhibit premature vulcanization is of Formula (a) wherein

is

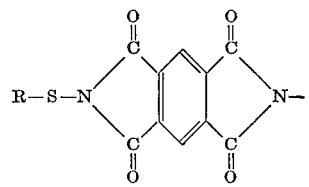

where R has the same meaning as in Formula (a).

4. The method according to claim 1 where the rubber also contains an organic vulcanization accelerating agent and where the compound to inhibit premature vulcanization is of Formula (a) where

is a radical derived by removal of hydrogen from an imide of a dicarboxylic acid, which radical has the formula

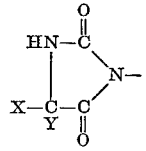

where X and Y individually are hydrogen, alkyl, aryl, or cycloalkyl.

5. The method according to claim 1 where the rubber also contains an organic vulcanization accelerating agent and where the compound ot inhibit premature vulcanization is of Formula (a) wherein R is cycloalkyl and

is

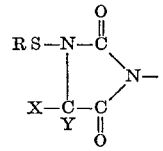

X and Y individually being hydrogen, alkyl, aryl or cycloalkyl, and where R has the same meaning as before.

6. The method according to claim 1 where the rubber also contains an organic vulcanization accelerating agent and where the compound to inhibit premature vulcanization is of formula (a) wherein

is a radical derived by removal of hydrogen from a monocarbonyl cyclic urea which radical has the formula

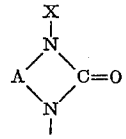

where A is alkylene, cycloalkylene, arylene, alkenylene, or cycloalkenylene, and X is hydrogen, R, or SR, R having the same meaning as in formula (a).

7. The method according to claim 1 where the rubber also contains an organic vulcanization accelerating agent and where the compound to inhibit premature vulcanization is of formula (a) wherein

is a radical derived by removal of hydrogen from a mono-carbonyl azole which radical has the formula

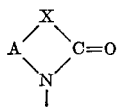

wherein A is arylene and X is oxygen or sulfur.

8. The method according to claim 1 where the rubber also contains an organic vulcanization accelerating agent and where the compound to inhibit premature vulcanization is of formula (b).

9. The method according to claim 8 wherein Y and Z are hydrogen and X is SR.

10. The method according to claim 1 where the rubber also contains an organic vulcanization accelerating agent and where the compound to inhibit premature vulcanization is of formula (c).

11. The method according to claim 10 where $n$, $n'$, and $n''$ are one and X is hydrogen.

12. The method according to claim 10 wherein $n$ is one, $n'$ is two, and $n''$ is zero.

13. The method according to claim 10 where

is benzoyl and $n$ is one.

14. The method of inhibiting premature vulcanization of a sulfur vulcanizable diene rubber containing a vulcanizing agent and an organic vulcanization accelerating agent, which comprises:
incorporating therein, in an amount effective to inhibit premature vulcanization, a compound of the formula R'—S—R where R' is an imido radical and R is alkyl, aryl, or cycloalkyl.

15. Diene rubber vulcanizable compositions having improved resistance to premature vulcanization comprising vulcanizable diene rubber containing a sulfur vulcanizing agent, an organic vulcanization accelerating agent and in amount effective to inhibit premature vulcanization, a compound of the formula R'—S—R where R' is an imido radical and R is alkyl, aryl, or cycloalkyl.

16. The method of inhibiting premature vulcanization of a sulfur vulcanizable diene rubber containing a vulcanizing agent and an organic vulcanization accelerating agent which comprises:
incorporating therein in an amount effective to inhibit premature vulcanization a compound selected from the group consisting of the formulas (a)

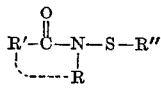

wherein R and R' with the carbonyl and N atom are N-phthalimidyl, N - succinimidyl, 1,4,5,6,7,7 - hexachlorobicyclo[2.2.1]hept-5-ene - 2,3 - dicarboximid-N - yl, hydantoinyl, 5,5-dimethyl-3-hydantoinyl, 5,5-diphenyl-3-hydantoinyl, N-maleimidyl, N-adipimidyl, N-glutarimidyl, N-3,3-dimethylglutarimidyl, N-hexahydro-phthalimidyl, 7-oxabicyclo[3.2.2]heptane - 2,3-dicarboximid-N-yl, 7 - oxabicyclo[2.2.1]hept - 5-ene-2,3 - dicarboximid-N-yl, tetrapropenylsuccinimid-N-yl, methylsuccinimid-N-yl, octadecylsuccinimid-N-yl, n-decenylsuccinimid - N-yl, 4-cyclohexene-1,2-dicarboximid-N-yl, 2-benzimidazolinon-1-yl, 3-arylthio-2-benzimidazolinon-1-yl, 3-alkylthio-2-benzimidazolinon - 1 - yl, 3-cycloalkylthio - 2-benzimidazolinon-1-yl, 2-imidazolidinon - 1 - yl, 3-arylthio-2-imidazolidinon-1-yl, 3-alkylthio - 2 - imidazolidinon - 1-yl, 3-cycloalkylthio - 2 - imidazolidinon - 1-yl, 3 - arylthio - 2 - imidazolinon - 1-yl, 3-alkylthio - 2-imidazolinon - 1-yl, 3-cycloalkylthio - 2-imidazolinon - 1-yl, bicyclo[2.2.1]hept - 5 - ene - 2,3-dicarboximid-N-yl, alkylbicyclo[2.2.1]hept.-5-ene-2,3-dicarboximid-N-yl, N-(arylthio) - 1,2,4,5 - benzenetetracarboxylic - 1,2:4,5 - diimid - N'-yl, N-(cycloalkylthio) - 1,2,4,5 - benzenetetracarboxylic 1,2:4,5-diimid - N'-yl, N-(alkylthio) - 1,2,4,5-benzenetetracarboxylic - 1,2:4,5-diimid - N'-yl, N-naphthalimidyl, or N-(3,4,5,6-tetrahalophthalimidyl, and
R" is aryl, cycloalkyl, or alkyl and (b)

wherein

is N-(arylthio)carbamoyl, N-(alkylthio)carbamoyl, N - (cycloalkylthio)carbamoyl, N - arylcarbamoyl, N - alkylcarbamoyl, or N-cycloalkylcarbamoyl, and
R' is alkyl, cycloalkyl, or aryl.

17. Diene rubber vulcanizable compositions having improved resistance to premature vulcanization comprising vulcanizable diene rubber containing a sulfur vulcanizing agent, an organic vulcanization accelerating agent and in amount effective to inhibit premature vulcanization a compound selected from the group consisting of the formulas (a)

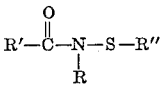

wherein R and R' with the carbonyl and N atom are N-phthalimidyl, N - succinimidyl, 1,4,5,6,7,7 - hexachlorobicyclo[2.2.1]hept-5-ene - 2,3 - dicarboximid-N - yl, hydantoinyl, 1-cyclohexylthio-3-hydantoinyl, 5,5 - dimethyl-3-hydantoinyl, 5,5-diphenyl-3-hydantoinyl, N-maleimidyl, N-adipimidyl, N-glutarimidyl, N-3,3-dimethylglutarimidyl, N-hexahydro-phthalimidyl, 7-oxabicyclo[2.2.1.]heptane-2,3 - dicarboximid-N - yl, 7 - oxabicyclo[2.2.1]hept-5-ene-2,3-dicarboximid-N-yl, tetrapropenylsuccinimid-N-yl, methylsuccinimid-N-yl, octadecylsuccinimid-N-yl, n - decenylsuccinimid - N-yl, 4-cyclohexene-1,2-dicarboximid-N-yl, 2-benzimidazolinon-1-yl, 3-arylthio-2-benzimidazolinon-1-yl, 3-alkylthio-2-benzimidazolinon-1-yl, 3-cycloalkylthio-2-benzimidazolinon-1 - yl, 2-imidazolidinon - 1 - yl, 3-arylthio - 2 - imidazolinon - 1 - yl, 3-alkylthio - 2 - imidazolinon-1-yl, 3-cycloalkylthio-2 - imidazolidinon-1-yl, bicyclo[2.2.1]hept-5-ene-2,3-dicarboximid-N-yl, alkyl-bicyclo[2.2.1]hept - 5 - ene-2,3-dicarboximid - N - yl, N- - (arylthio) - 1,2,4,5-benzenetetracarboxylic-1,2:4,5 - diimid - N' - yl, N-(cycloalkylthio) - 1,2,4,5 - benzenetetracarboxylic-1,2:4,5 - diimid - N'-yl, N - (alkylthio)-1,2,4,5-benzenetetracarboxylic - 1,2:4,5 - diimid - N' - yl, N-naphthalimidyl or N-(3,4,5,6 - tetrahalophthalimidyl, and
R" is aryl, cycloalkyl, or alkyl and (b)

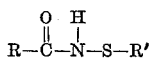

wherein

is N-(arylthio)carbamoyl, N-(alkylthio)carbamoyl, N - (cycloalkylthio)carbamoyl, N - arylcarbamoyl, N - alkylcarbamoyl, or N-cycloalkylcarbamoyl, and
R' is alkyl, cycloalkyl, or aryl.

18. The method of inhibiting premature vulcanization of a sulfur vulcanizable diene rubber containing a vulcanizing agent and an organic vulcanization accelerating agent which comprises:
incorporating therein in an amount effective to inhibit premature vulcanization a compound selected from the group consisting of the formulas (a) 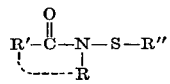

wherein R and R' with the carbonyl and N atom are N-phthalimidyl, N - succinimidyl, 1,4,5,6,7,7 - hexachlorobicyclo[2.2.1]hept-5-ene - 2,3 - dicarboximid - N - yl, hydantoinyl, 1 - cyclohexylthio-3-hydantoinyl, 5,5 - dimethyl-3-hydantoinyl, 5,5-diphenyl-3-hydantoinyl, N-maleimidyl, N-adipimidyl, N-glutarimidyl, N-3,3-dimethylglutarimidyl, N-hexahydro-phthalimidyl, 7-oxabicyclo[2.2.1]heptane-2,3 - dicarboximid-N - yl, 7 - oxabicyclo[2.2.1]hept-5-ene-2,3-dicarboximid-N-yl, tetrapropenylsuccinimid-N-yl, methylsuccinimid-N-yl, octadecylsuccinimid-N-yl, n - decenylsuccinimid - N - yl, 4-cyclohexene-1,2-dicarboximid-N-yl, 2-benzimidazolinon - 1-yl, 3-chlorophenylthio-2-benzimidazolinon - 1-yl, 3-phenylthio - 2 - benzimidazolinon - 1-yl, 3-benzylthio - 2 - benzimidazolinon-1-yl, 3-nitrophenylthio - 2 - benzimidazolinon - 1-yl, 3-alkylthio - 2 - benzimidazolinon-1-yl, 3-cycloalkylthio - 2 - benzimidazolinon - 1-yl, 3 - tolylthio - 2-benzimidazolinon - 1-yl, 2-imidazolidinon - 1-yl, 3-phenylthio - 2 - imidazolidinon-1-yl, 3-chlorophenylthio - 2 - imidazolidinon - 1 - yl, 3 - benzylthio-2-imidazolidinon - 1 - yl, 3 - tolylthio - 2 - imidazolidinon - 1 - yl, 3 - cycloalkylthio - 2 - imidazolidinon-1-yl, 3-alkylthio - 2 - imidazolidinon-1-yl, 2-imidazolinon-1-yl, 3-phenylthio - 2 - imidazolinon-1-yl, 3-chlorophenylthio - 2 - imidazolinon-1-yl, 3-benzylthio-2-imidazolinon-1-yl, 3-tolylthio - 2 - imidazolinon-1-yl, 3-cycloalkylthio - 2 - imidazolinon-1-yl, 3-alkylthio - 2 - imidazolinon-1-yl, bicyclo[2.2.1]hept-5-ene-2,3-dicarboximid - N - yl, alkylbicyclo[2.2.1]hept - 5 - ene - 2,3 - dicarboximid - N - yl, N-(phenylthio) - 1,2,4,5 - benzenetetracarboxylic-1,2:4,5-diimid-N'-yl, N-(benzylthio) - 1,2,4,5 - benzenetetracarboxylic-1,2:4,5 - diimid - N' - yl, N - (chlorophenylthio) - 1,2,4,5 - benzenetetracarboxylic - 1,2:4,5-diimid - N' - yl, N - (nitrophenylthio) - 1,2,4,5 - benzenetetracarboxylic - 1,2:4,5 - diimid - N' - yl, N-(alkylthio) - 1,2,4,5 - benzenetetracarboxylic-1,2:4,5-diimid-N'-yl, N-(cycloalkylthio) - 1,2,4,5 - benzenetetracarboxylic - 1,2:4,5 - diimid - N' - yl, N-(tolylthio) - 1,2,4,5 - benzenetetracarboxylic - 1,2:4,5 - diimid - N' - yl, N - naphthalimidyl, or N - (3,4,5,6 - tetrahalophthalimidyl), and R" is phenyl, benzyl, chlorophenyl, nitrophenyl, tolyl, cycloalkyl, primary alkyl, or secondary alkyl and (b) 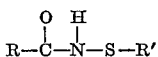

wherein

is N - (phenylthio)carbamoyl, N - (chlorophenylthio)carbamoyl, N - (benzylthio)carbamoyl, N-(tolylthio)carbamoyl, N - (alkylthio)carbamoyl, N-(cycloalkylthio)carbamoyl, N - phenylcarbamoyl, N-alkylcarbamoyl, N - cycloalkylcarbamoyl, N-benzylcarbamoyl, N - nitrophenylcarbamoyl, N - chlorophenylcarbamoyl, or N - toylcarbamoyl, and R' is phenyl, benzyl, chlorophenyl, nitrophenyl, tolyl, primary alkyl, secondary alkyl, or cycloalkyl.

19. Diene rubber vulcanizable compositions having improved resistance to premature vulcanization comprising vulcanizable diene rubber containing a sulfur vulcanizing agent, an organic vulcanization accelerating agent and in amount effective to inhibit premature vulcanization a compound selected from the group consisting of the formulas (a) 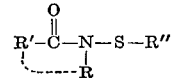

wherein R and R' with the carbonyl and N atom are N-phthalimidyl, N - succinimidyl, 1,4,5,6,7,7-hexachlorobicyclo[2.2.1]-hept-5-ene-2,3 - dicarboximid - N-yl, hydantoinyl, 1 - cyclohexylthio-3-hydantoinyl, 5,5-dimethyl-3-hydantoinyl, 5,5-diphenyl-3-hydantoinyl, N-maleimidyl, N-adipimidyl, N-glutarimidyl, N-3,3-dimethylglutarimidyl, N-hexahydrophthalimidyl, 7-oxabicyclo[2.2.1]heptane - 2,3 - dicarboximid - N - yl, 7-oxabicyclo[2.2.1]hept-5-ene - 2,3-dicarboximid-N-yl, tetrapropenylsuccinimid-N-yl, methylsuccinimid - N - yl, octadecylsuccinimid - N - yl, n-decenylsuccinimid-N-yl, 4-cyclohexene-1,2-dicarboximid-N-yl, 2 - benzimidazolinon-1-yl, 3-chlorophenylthio-2-benzimidazolinon-1-yl, 3-phenylthio - 2 - benzimidazolinon-1-yl, 3-benzylthio - 2 - benzimidazolinon - 1 - yl, 3-nitrophenylthio-2-benzimidazolinon-1-yl, 3-alkylthio - 2-benzimidazolinon-1-yl, 3 - cycloalkylthio-2-benzimidazolinon-1-yl, 3-tolylthio - 2 - benzimidazolinon-1-yl, 2-imidazolidinon-1-yl, 3-phenylthio-2-imidazolidinon-1-yl, 3-chlorophenylthio-2-imidazolidinon - 1 - yl, 3-benzylthio-2-imidazolidinon-1-yl, 3 - tolylthio-2-imidazolidinon-1-yl, 3 - cycloalkylthio-2-imidazolidinon-1-yl, 3-alkylthio-2-imidazolidinon-1-yl, 2-imidazolinon-1-yl, 3-phenylthio - 2 - imidazolinon - 1 - yl, 3-chlorophenylthio-2-imidazolinon-1-yl, 3 - benzylthio-2-imidazolinon-1-yl, 3-tolylthio-2-imidazolinon-1-yl, 3-cycloalkylthio-2-imidazolinon-1-yl, 3-alkylthio - 2 - imidazolinon-1-yl, bicyclo[2.2.1]hept - 5 - ene - 2,3-dicarboximid-N-yl, alkylbicyclo[2.2.1]hept-5-ene - 2,3-dicarboximid-N-yl, N - (phenylthio)1,2,4,5-benzenetetracarboxylic-1,2:4,5-diimid-N'-yl, N-(benzylthio)-1,2,4,5-benzenetetracarboxylic - 1,2:4,5-diimid-N'-yl, N - (chlorophenylthio) - 1,2,4,5 - benzenetetracarboxylic-1,2:4,5-diimid - N' - yl, N-(nitrophenylthio)-1,2,4,5-benzenetetracarboxylic - 1,2:4,5-diimid-N'-yl, N - (alkylthio) - 1,2,4,5 - benzenetetracarboxylic-1,2:4,5-diimid-N'-yl, N-(cycloalkylthio)-1,2,4,5-benzenetetracarboxylic-1,2:4,5-diimid-N' - yl, N - (tolylthio)-1,2,4,5 - benzenetetracarboxylic-1,2:4,5-diimid-N'-yl, N-naphthalimidyl, or N - (3,4,5,6 - tetrahalophthalimidyl), and R" is phenyl, benzyl, chlorophenyl, nitrophenyl, tolyl, cycloalkyl, primary alkyl, or secondary alkyl and (b) 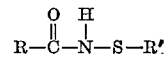

wherein

is N-(phenylthio)carbamoyl, N-(chlorophenylthio)carbamoyl, N - (benzylthio)carbamoyl, N-tolylthio)carbamoyl, N-(alkylthio)carbamoyl, N - cycloalkylthio)carbamoyl, N - phenylcarbamoyl, N - alkylcarbamoyl, N-cycloalkylcarbamoyl, N-benzylcarbamoyl, N-nitrophenylcarbamoyl, N-chlorophenylcarbamoyl, or N-tolylcarbamoyl, and R' is phenyl, benzyl, chlorophenyl, nitrophenyl, tolyl, primary alkyl, secondary alkyl, or cycloalkyl.

20. The method of inhibiting premature vulcanization of rubber according to claim 18 wherein the vulcanizing agent is elemental sulfur.

21. The method of inhibiting premature vulcanization of rubber according to claim 18 wherein the organic accelerating agent is a thiazole accelerator, aryl guanidine accelerator, organic disulfide accelerator, thiocarbamylsulfenamide accelerator, or mixtures thereof.

22. The method of inhibiting premature vulcanization of rubber according to claim 18 wherein the mixture contains an amine antidegradant selected from the group consisting of N,N'-bis(1,4-dimethylpentyl) - p - phenylenediamine, N - 1,3-dimethylbutyl-N'-phenyl - p - phenylenediamine, and mixtures thereof.

23. Diene rubber vulcanizable compositions having improved resistance to premature vulcanization according to claim 19 wherein the mixture contains an amine antidegradant selected from the group consisting of N,N'-bis (1,4 - dimethylpentyl)-p-phenylenediamine, N - 1,3 - dimethylbutyl-N'-phenyl-p-phenylenediamine, and mixtures thereof.

24. The method of inhibiting premature vulcanization of rubber according to claim 21 wherein the accelerator is 2-(morpholinothio)benzothiazole.

25. The method of inhibiting premature vulcanization of rubber according to claim 21 wherein the accelerator is N-tert-butyl-2-benzothiazolesulfenamide.

26. The method of inhibiting premature vulcanization of rubber according to claim 21 wherein the accelerator is mercaptobenzothiazole.

27. The method of inhibiting premature vulcanization of rubber according to claim 21 wherein the accelerator is benzothiazyl disulfide.

28. The method of inhibiting premature vulcanization of rubber according to claim 18 wherein the inhibitor is N-(phenylthio)succinimide.

29. The method of inhibiting premature vulcanization of rubber according to claim 18 wherein the inhibitor is 1,3-bis-(phenylthio)-2-benzimidazolinone.

30. The method of inhibiting premature vulcanization of rubber according to claim 18 wherein the inhibitor is N,N'-di(phenylthio)urea.

31. The method of inhibiting premature vulcanization of rubber according to claim 18 wherein the inhibitor is N-(phenylthio)maleimide.

32. The method of inhibiting premature vulcanization of rubber according to claim 18 wherein the inhibitor is N-(tolylthio)phthalimide.

33. The method of inhibiting premature vulcanization of rubber according to claim 18 wherein the inhibitor is N-(cyclohexylthio)phthalimide.

34. Diene rubber vulcanizable compositions having improved resistance to premature vulcanization according to claim 19 wherein the inhibitor is N-(cyclohexylthio) phthalimide.

35. The method of inhibiting premature vulcanization of rubber according to claim 18 wherein the inhibitor is N-(cyclohexylthio)succinimide.

36. The method of inhibiting premature vulcanization of rubber according to claim 18 wherein the inhibitor is N-(isopropylthio)phthalimide.

37. The method of inhibiting premature vulcanization of rubber according to claim 18 wherein the inhibitor is N-(n-butylthio)phthalimide.

38. The method of inhibiting premature vulcanization of rubber according to claim 18 wherein the inhibitor is N-(n-dodecylthio)phthalimide.

39. The method of inhibiting premature vulcanization of vulcanizable diene rubber according to claim 16 including the following additional element:
heating the mixture.

40. The method of inhibiting premature vulcanization of a vulcanizable diene rubber according to claim 18 including the following additional element:
heating the mixture at a vulcanizing temperature.

41. An accelerator-inhibitor combination comprised of an organic vulcanization accelerating agent and a compound, in an amount effective to inhibit premature vulcanization of a vulcanizable diene rubber, selected from a group consisting of the formulas:

(a)
$$\overset{O}{\underset{N-S-R}{\overset{\|}{C}}}$$

wherein $$\overset{O}{\underset{N-}{\overset{\|}{C}}}$$

is a radical derived by removal of hydrogen from an imide of a dicarboxylic acid, from an imide in which the nitrogen is linked to carbonyl by alkylene, from a monocarbonyl cyclic urea, and from a monocarbonyl azole containing one other different hetero atom in the ring, and R is aryl, alkyl, or cycloalkyl, (b)
$$X-\overset{Y}{N}-\overset{O}{\overset{\|}{C}}-\overset{Z}{N}-SR$$

where X, Y, and Z individually are hydrogen, R, or SR, R having the same meaning as before, and (c)
$$(R\overset{O}{\overset{\|}{C}}-)_n\overset{(X)_{n''}}{N}(-SR)_{n'}$$

where $n$, $n'$, and $n''$ are integers, the sum of which is three, $n$ and $n'$ being one or two, and $n''$ being zero or one, and R and X having the same meaning as before.

42. An accelerator-inhibitor combination comprised of an organic vulcanization accelerating agent and a compound, in an amount effective to inhibit premature vulcanization of a vulcanizable diene rubber, selected from the group consisting of the formulas:

(a)
$$R'-\overset{O}{\overset{\|}{C}}-\overset{}{\underset{R}{N}}-S-R''$$

wherein R and R' with the carbonyl and N atom are N-phthalimidyl, N - succinimidyl, 1,4,5,6,7,7 - hexachlorobicyclo[2.2.1]hept-5-ene-2,3-dicarboximid - N - yl, hydantoinyl, 1-cyclohexylthio-3-hydantoinyl, 5,5 - dimethyl - 3 - hydantoinyl, 5,5 - diphenyl - 3 - hydantoinyl, N-maleimidyl, N-adipimidyl, N-glutarimidyl, N-3,3-dimethylglutarimidyl, N - hexahydrophthalimidyl, 7 - oxabicyclo[2.2.1]heptane - 2,3 - dicarboximid - N - yl, 7 - oxabicyclo[2.2.1]hept-5-ene-2,3-dicarboximid-N-yl, tetrapropenylsuccinimid - N-yl, methylsuccinimid-N-yl, octadecylsuccinimid-N-yl, n-decenylsuccinimid - N - yl, 4-cyclohexene-1,2-dicarboximid-N-yl, 2-benzimidazolinon - 1 - yl, 3-chlorophenylthio-2-benzimidazolinon - 1 - yl, 3-phenylthio-2-benzimidazolinon-1-yl, 3-benzylthio-2-benzimidazolinon-1-yl, 3 - nitrophenylthio-2-benzimidazolinon-1-yl, 3 - cycloalkylthio - 2 - benzimidazolinon-1-yl, 3-alkylthio-2-benzimidazolinon - 1 - yl, 3-tolylthio-2-benzimidazolinon-1-yl, 2 - imidazolidinon - 1-yl, 3 - phenylthio-2-imidazolidinon-1-yl, 3 - chlorophenylthio-2-imidazolidinon-1-yl, 3 - benzylthio - 2-imidazolidinon-1-yl, 3-tolylthio - 2 - imidazolidinon-1-yl, 3-cycloalkylthio-2-imidazolidinon - 1 - yl, 3-alkylthio-2-imidazolidinon-1-yl, 2-imidazolinon-1-yl, 3 - phenylthio-2-imidazolinon-1-yl, 3 - chlorophenylthio-2-imidazolinon-1-yl, 3 - benzylthio - 2 - imidazolinon-1-yl, 3-tolylthio-2-imidazolinon-1-yl, 3 - alkylthio-2-imidazolinon-1-yl, 3-cycloalkylthio-2-imidazolinon-1-yl, bicyclo[2.2.1]hept-5-ene-2,3-dicarboximid-N-yl, alkylbicyclo[2.2.1]hept - 5 - ene - 2,3 - dicarboximid-N-yl, N-(phenylthio) - 1,2,4,5 - benzenetetracarboxylic-1,2:4,5-diimid-N'-yl, N - (benzylthio)-1,2,4,5-benzenetetracarboxylic - 1,2:4,5 - diimid - N'-yl, N - (chlorophenylthio) - 1,2,4,5 - benezenetetracarboxylic-1,2:4,5-diimid-N'-yl, N - (nitrophenylthio)-1,2,4,5-benzenetetracarboxylic - 1,2:4,5 - diimid-N'-yl, N-(alkylthio)-1,2,4,5 - benezenetetracarboxylic-1,2:4,5-diimid-N'-yl, N-(cycloalkylthio) - 1,2,4,5-benzenetetracarboxylic-1,2:4,5-diimid-N'-yl, N - (tolylthio)-1,2,4,5 - benzenetetracarboxylic - 1,2:4,5 - diimid-N'-yl, N-naphthalimidyl, or N-(3,4,5,6 - tetrahalophthalimidyl), and R" is phenyl, benzyl, chlorophenyl, nitrophenyl, tolyl, cycloalkyl, primary alkyl, or secondary alkyl and (b)
$$R\overset{O}{\underset{\|}{C}}-\overset{H}{\underset{|}{N}}-S-R'$$

wherein $$R-\overset{O}{\underset{\|}{C}}-$$

is N-(phenylthio)carbamoyl, N-(chlorophenylthio)carbamoyl, N-(benzylthio)carbamoyl, N-(tolylthio)carbamoyl, N-(alkylthio)carbamoyl, N-(cycloalkylthio)carbamoyl, N-phenylcarbamoyl, N-alkylcarbamoyl, N-cycloalkylcarbamoyl, N-benzylcarbamoyl, N-nitrophenylcarbamoyl, N-chlorophenylcarbamoyl, or N-tolylcarbamoyl, and R' is phenyl, benzyl, chlorophenyl, nitrophenyl, tolyl, primary alkyl, secondary alkyl, or cycloalkyl.

43. An accelerator-inhibitor combination according to claim 42 wherein the accelerator is a sulfenamide accelerator and the inhibitor is N-(phenylthio)succinimide.

44. An accelerator-inhibitor combination according to claim 42 wherein the inhibitor is N-(cyclohexylthio)phthalimide.

45. An accelerator-inhibitor combination according to claim 42 wherein the accelerator is a sulfenamide accelerator and the inhibitor is N-(cyclohexylthio)phthalimide.

46. An accelerator-inhibitor combination according to claim 42 wherein the accelerator is N-tert-butyl-2-benzothiazolesulfenamide and the inhibitor is N-(cyclohexylthio)phthalimide.

47. An accelerator-inhibitor combination according to claim 42 wherein the accelerator is 2-(morpholinothio)benzothiazole and the inhibitor is N-(cyclohexylthio)phthalimide.

48. An accelerator-inhibitor combination according to claim 42 wherein the accelerator is a sulfenamide accelerator and the inhibitor is N-(cyclohexylthio)succinimide.

49. An accelerator-inhibitor combination according to claim 42 wherein the accelerator is a sulfenamide accelerator and the inhibitor is N-(n-butylthio)phthalimide.

50. Diene rubber having incorporated therein a compound selected from the group consisting of the formulas:

(a)
$$\begin{array}{c} O \\ \| \\ \overset{}{C} \\ \overset{}{\underset{}{\underset{}{\underset{}{\vdots}}}} \\ \text{-N-S-R} \end{array}$$

wherein $$\begin{array}{c} O \\ \| \\ \overset{}{C} \\ \overset{}{\underset{}{\underset{}{\underset{}{\vdots}}}} \\ \text{-N-} \end{array}$$

is a radical derived by removal of hydrogen from a imide of a dicarboxylic acid, from an imide in which the nitrogen is linked to carbonyl by alkylene, from a monocarbonyl cyclic urea, and from a monocarbonyl azole containing one other different hetero atom in the ring, and R is aryl, hydrocarbon alkyl, or cyaloalkyl, (b)
$$X-\overset{Y}{\underset{|}{N}}-\overset{O}{\underset{\|}{C}}-\overset{Z}{\underset{|}{N}}-SR$$

where X, Y, and Z individually are hydrogen, R, or SR, R having the same meaning as before, and (c)
$$(R\overset{O}{\underset{\|}{C}}-)_n\overset{(X)_{n''}}{\underset{|}{N}}(-SR)_{n'}$$

where $n$, $n'$, and $n''$ are integers, the sum of which is three, $n$ and $n'$ being one or two, and $n''$ being zero or one, and R and X having the same meaning as before.

51. A composition according to claim 50 wherein the rubber is a synthetic rubber which contains about 0.1 to about 5 parts of a compound of claim 50.

52. A styrene-butadiene rubber composition according to claim 50 containing about 1.25 parts N-(cyclohexylthio)phthalimide per hundred parts of rubber.

53. Diene rubber having incorporated therein a compound selected from the group consisting of the formulas:

(a)
$$R'-\overset{O}{\underset{\|}{C}}-\overset{}{\underset{|}{N}}-S-R''$$
$$\overset{}{\underset{-----R}{}}$$

wherein R and R' with the carbonyl and N atom are N-phthalimidyl, N-succinimidyl, 1,4,5,6,7,7-hexachlorobicyclo[2.2.1]hept - 5 - ene-2,3-dicarboximid-N-yl, hydantoinyl, 1 - cyclohexylthio - 2 - hydantoinyl, 5,5-dimethyl-3-hydantoinyl, 5,5-diphenyl - 3 -hydantoinyl, N-maleimidyl, N-adipimidyl, N-glutarimidyl, N-3,3-dimethylglutarimidyl, N - hexahydro - phthalimidyl, 7-oxabicyclo[2.2.1]heptane-2,3-dicarboximid - N - yl, 7-oxabicyclo[2.2.1]hept - 5 - ene - 2,3-dicarboximid-N-yl, tetrapropenylsuccinimid - N - yl, methylsuccinimid - N - yl, octadecylsuccinimid-N-yl, n-decenylsuccinimid-N-yl, 4 - cyclohexene-1,2-dicarboximid-N-yl, 2-benzimidazolinon - 1 - yl, 3-arylthio-2-benzimidazolinon-1-yl, 3-alkylthio - 2 - benzimidazolinon - 1 - yl, 3-cycloalkylthio - 2 - benzimidazolinon-1-yl, 2-imidazolidinon - 1 - yl, 3-arylthio-2-imidazolidinon-1-yl, 3-alkylthio - 2 - imidazolidinon-1-yl, 3-cycloalkylthio - 2 - imidazolidinon-1-yl, 2-imidazolinon-1-yl, 3-arylthio - 2-imidazolinon-1-yl, 3-alkylthio-2-imidazolinon-1-yl, 3-cycloalkylthio - 2 - imidazolinon-1-yl, bicyclo[2.2.1]hept - 5-ene-2,3-dicarboximid-N-yl, alkylbicyclo[2.2.1]hept - 5 - ene-2,3-dicarboximid-N-yl, N-(arylthio)-1,2,4,5 - benzenetetracarboxylic-1,2:4,5-diimid-N'-yl, N-(cycloalkylthio) - 1,2,4,5 - benzenetetracarboxylic - 1,2:4,5-diimid-N'-yl, N-(alkylthio)-1,2,4,5 - benzenetetracarboxylic-1,2:4,5-diimid-N'-yl, N-naphthalimidyl, or N-(3,4,5,6-tetrahalophthalimidyl), and R" is aryl, cycloalkyl, or alkyl hydrocarbon, and (b)
$$R-\overset{O}{\underset{\|}{C}}-\overset{H}{\underset{|}{N}}-S-R'$$

wherein $$R-\overset{O}{\underset{\|}{C}}-$$

is N-(arylthio)carbamoyl, N-(alkylthio)carbamoyl, N-(cycloalkylthio)carbamoyl, N-arylcarbamoyl, N-alkylcarbamoyl, or N-cycloalkylcarbamoyl, and R' is alkyl hydrocarbon, cycloalkyl, or aryl.

54. A composition according to claim 53 wherein the rubber is a synthetic rubber which contains about 0.1 to about 5 parts of a compound of claim 53.

55. A styrene-butadiene rubber composition according to claim 54 containing about 0.5 to 3.0 parts N-(cyclohexylthio)-phthalimide per hundred parts of rubber.

56. A stabilized thiazole sulfenamide composition for rubber compounding comprising a thiazole sulfenamide accelerator and a stabilizing amount of a compound selected from the group consisting of the formulas:

(a)
$$\begin{array}{c} O \\ \| \\ \overset{}{C} \\ \overset{}{\underset{}{\underset{}{\underset{}{\vdots}}}} \\ \text{-N-S-R} \end{array}$$

wherein $$\begin{array}{c} O \\ \| \\ \overset{}{C} \\ \overset{}{\underset{}{\underset{}{\underset{}{\vdots}}}} \\ \text{-N-} \end{array}$$

is a radical derived by removal of hydrogen from an imide of a dicarboxylic acid, from an imide in which the nitrogen is linked to carbonyl by alkylene, from a monocarbonyl cyclic urea, and from a monocarbonyl azole containing one other different hetero atom in the ring, and R is aryl, hydrocarbon alkyl, or cycloalkyl, (b) 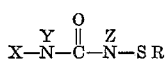

where X, Y, and Z individually are hydrogen, R, or SR, R having the same meaning as before, and (c) 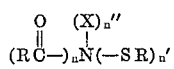

where $n$, $n'$, and $n''$ are integers, the sum of which is three, $n$ and $n'$ being one or two, and $n''$ being zero or one, and R and X having the same meaning as before.

57. A stabilized thiazole sulfenamide composition for rubber compounding comprising a thiazole sulfenamide accelerator and a stabilizing amount of a compound selected from the group consisting of the formulas:

(a) 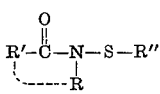

wherein R and R' with the carbonyl and N atom are N-phthalimidyl, N-succinimidyl, 1,4,5,6,7,7-hexachlorobicyclo[2.2.1]-hept - 5 - ene-2,3-dicarboximid-N-yl, hydantoinyl, 1-cyclohexylthio - 3 - hydantoinyl, 5,5-dimethyl - 3 - hydantoinyl, 5,5-diphenyl-3-hydantoinyl, N-maleimidyl, N-adipimidyl, N-glutarimidyl, N-3,3-dimethylglutarimidyl, N-hexahydro-phthalimidyl, 7-oxabicyclo[2.2.1]heptane - 2,3 - dicarboximid-N-yl, 7-oxabicyclo[2.2.1]hept - 5 - ene - 2,3 - dicarboximid-N-yl, tetrapropenylsuccinimid - N - yl, methylsuccinimid-N-yl, octadecylsuccinimid-N-yl, n-decenylsuccinimid-N-yl, 4 - cyclohexene - 1,2 - dicarboximid-n-yl, 2-benzimidazolinon-1-yl, 3-chlorophenylthio - 2 - benzimidazolinin - 1 - yl, 3-phenylthio-2-benzimidazolinon - 1 - yl, 3-benzylthio - 2-benzimidazolinon-1-yl, 3 - nitrophenylthio-2-benzimidazolinon-1-yl, 3-cycloalkylthio - 2 - benzimidazolinon-1-yl, 3-alkylthio - 2 - benzimidazolinon-1-yl, 3-tolylthio-2-benzimidazolinon - 1 - yl, 2 - imidazolidinon-1-yl, 3-phenylthio-2-imidazolidinon - 1 - yl, 3-chlorophenylthio-2-imidazolidinon - 1 - yl, 3-benzylthio-2-imidazolidinon-1-yl, 3-tolylthio - 2 - imidazolidinon-1-yl, 3-cycloalkylthio - 2 - imidazolidinon-1-yl, 3-alkylthio-2-imidazolidinon-1-yl, 2-imidazolinon-1-yl, 3-phenylthio-2-imidazolinon - 1 - yl, 3-chlorophenylthio-2-imidazolinon-1-yl, 3 - benzylthio - 2 - imidazolinon-1-yl, 3 - tolylthio - 2 - imidazolinon-1-yl, 3-alkylthio-2-imidazolinon-1-yl, 3-cycloalkylthio-2-imidazolinon-1-yl, bicyclo[2.2.1]hept - 5 - ene-2,3-dicarboximid-N-yl, alkylbicyclo[2.2.1]hept - 5 - ene-2,3 - dicarboximid-N - yl, N - (phenylthio) - 1,2,4,5 - benzenetetracarboxylic-1,2:4,5-diimid-N'-yl, N - (benzylthio)-1,2,4,5 - benzenetetracarboxylic - 1,2:4,5 - diimid-N'-yl, N - (chlorophenylthio)-1,2,4,5 - benzenetetracarboxylic - 1,2:4,5 - diimid-N'-yl, N-(nitrophenylthio)-1,2,4,5 - benzenetetracarboxylic - 1,2:4,5 - diimid-N'-yl, N-(alkylthio) - 1,2,4,5 - benzenetetracarboxylic-1,2:4,5 - diimid-N'-yl, N-(cycloalkylthio) - 1,2,4,5-benzenetetracarboxylic - 1,2:4,5 - diimid-N'-yl, N-(tolylthio)-1,2,4,5 - benzenetetracarboxylic - 1,2:4,5-diimid - N' - yl, N-naphthalimidyl, or N-(3,4,5,6-tetrahalophthalimidyl), and R'' is phenyl, benzyl, chlorophenyl, nitrophenyl, tolyl, cycloalkyl, primary alkyl, or secondary alkyl and (b) 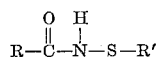

wherein

is N-(phenylthio)carbamoyl, N-(chlorophenylthio)-carbamoyl N-(benzylthio)carbamoyl, N-(tolylthio)carbamoyl, N - alkylthio)carbamoyl, N - (cycloalkylthio)carbamoyl, N-phenylcarbamoyl, N - alkylcarbamoyl, N-cycloalkylcarbamoyl, N - benzylcarbamoyl, N - nitrophenylcarbamoyl, N - chlorophenylcarbamoyl, or N-tolylcarbamoyl, and R' is phenyl, benzyl, chlorophenyl, nitrophenyl, tolyl, primary alkyl, secondary alkyl, or cycloalkyl.

58. A composition of claim 56 where the accelerator is N-tert-butyl-2-benzothiazolesulfenamide and the stabilizer is N-(cyclohexylthio)phthalimide.

59. The method according to claim 1 wherein R is trichloromethyl.

References Cited

UNITED STATES PATENTS

| | | | |
|---|---|---|---|
| 2,171,901 | 9/1939 | Wilson | 260—780 |
| 2,553,776 | 5/1951 | Kittleson | 260—326 |
| 3,276,855 | 10/1966 | Richter | 71—2.6 |
| 3,427,319 | 2/1969 | Coran | 260—309.2 |

FOREIGN PATENTS

| | | | |
|---|---|---|---|
| 164,670 | 10/1964 | U.S.S.R. | 260—79.5 |
| 969,281 | 9/1964 | Great Britain | 260—784 |

JOSEPH L. SCHOFER, Primary Examiner

C. A. HENDERSON, JR., Assistant Examiner

U.S. Cl. X.R.

260—281, 309.2, 309.5, 309.6, 309.7, 326, 326.3, 326.5, 453, 455, 553, 780, 784

UNITED STATES PATENT OFFICE
CERTIFICATE OF CORRECTION

Patent No. 3,546,185            Dated December 8, 1970

Inventor(s) Aubert Yaucher Coran and Joseph Edward Kerwood

It is certified that error appears in the above-identified patent and that said Letters Patent are hereby corrected as shown below:

Add to the Title: "With Sulfenamide Characterized by Carbonyl Adjacent to the Sulfenamide Nitrogen".

Column 1, line 26, after "cycloalkyl" and before the period, insert --are used to inhibit premature vulcanization of vulcanizable elastomers and to stabilize thiazole sulfenamide accelerators--.

Column 9, line 50, "amide" should read "amine".

Column 10, line 25, "compound" should read "compounds".

Column 10, line 29, "pasesd" should read "passed".

Column 11, line 10, "litter" should read "liter".

Column 14, Table I, Stock C opposite $t_{90}$ which reads "6.8" should read "26.8".

Column 14, line 23, "recoprocal" should read "reciprocal".

Column 14, line 63, stock no. 4, "Santoflex" should read "Santocure".

Column 15, line 50, "diphenylguahidine" should read "diphenylguanidine".

Column 15, line 53, second line of stock no. 10, "017 part" should read "0.7 part".

Column 18, line 40, "psthalimide" should read "phthalimide".

UNITED STATES PATENT OFFICE
CERTIFICATE OF CORRECTION

Patent No. 3,546,185          Dated December 8, 1970

Inventor(s) Aubert Yaucher Coran and Joseph Edward Kerwood

It is certified that error appears in the above-identified patent and that said Letters Patent are hereby corrected as shown below:

Column 18, line 70, "81%" should read "82%".

Column 19, line 8, after "Percent" add --increase--.

Column 24, line 48, "R.T.M." should read "R.M.T."

Column 24, line 65, "5.50" should read "5.0".

Column 28, line 15, "where" should read "wherein".

Column 28, line 32, "ot" should read "to".

Column 29, line 57, after "N-yl, hydantoinyl," add --1-cyclohexylthio-3-hydantoinyl,--.

Column 29, line 60, "[3.2.2]" should read "[2.2.1]".

Column 31, line 56, "$R-\overset{O}{\underset{|}{C}}-\overset{H}{\underset{|}{N}}-S-R'$" should read "$R-\overset{O}{\underset{\|}{C}}-\overset{H}{\underset{|}{N}}-S-R'$".

Column 36, line 13, "2" should read "3".

Signed and sealed this 10th day of August 1971.

(SEAL)
Attest:

EDWARD M. FLETCHER, JR.        WILLIAM E. SCHUYLER, JR.
Attesting Officer               Commissioner of Patents